(12) United States Patent
Liao et al.

(10) Patent No.: US 10,884,220 B2
(45) Date of Patent: Jan. 5, 2021

(54) OPTICAL IMAGING LENS

(71) Applicant: GENIUS ELECTRONIC OPTICAL (XIAMEN) CO., LTD., Fujian (CN)

(72) Inventors: Huabin Liao, Fujian (CN); Xinming Liu, Fujian (CN); Xue Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 228 days.

(21) Appl. No.: 16/015,205

(22) Filed: Jun. 22, 2018

(65) Prior Publication Data
US 2019/0302415 A1 Oct. 3, 2019

(30) Foreign Application Priority Data
Mar. 30, 2018 (CN) .......................... 2018 1 0295861

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .......... G02B 9/62; G02B 9/64; G02B 13/0045
See application file for complete search history.

(56) References Cited

U.S. PATENT DOCUMENTS

2011/0109974 A1* 5/2011 Sato .................. G02B 13/04
359/682

* cited by examiner

*Primary Examiner* — Darryl J Collins
*Assistant Examiner* — Journey F Sumlar
(74) *Attorney, Agent, or Firm* — JCIPRNET

(57) ABSTRACT

An optical imaging lens including a first lens element, a second lens element, a third lens element, a fourth lens element, a fifth lens element and a sixth lens element arranged in sequence from an object side to an image side along an optical axis is provided. Each lens element includes an object-side surface and an image-side surface. The first lens element has negative refracting power. The second lens element has negative refracting power, and a periphery region of the object-side surface of the second lens element is convex. An optical axis region of the image-side surface of the fourth lens element is concave. An optical axis region of the image-side surface of the sixth lens element is concave. A periphery region of the image-side surface of the sixth lens element is convex.

20 Claims, 22 Drawing Sheets

| First embodiment |||||||
|---|---|---|---|---|---|---|
| Effective focal length=1.686 mm, Half field of view=57.648°, System length= 5.608 mm, F-number= 2.4, Image height= 2.520 mm |||||||
| Element | Surface | Radius (mm) | Thickness (mm) | Refractive index | Abbe number | Focal length (mm) |
| Object | | Infinite | Infinite | | | |
| First lens element 1 | Object-side Surface 15 | 15.027 | 0.424 | 1.535 | 55.712 | -2.794 |
| | Image-side Surface 16 | 1.350 | 0.445 | | | |
| Second lens element 2 | Object-side Surface 25 | 1.606 | 0.354 | 1.535 | 55.712 | -20.000 |
| | Image-side Surface 26 | 1.290 | 0.360 | | | |
| Aperture 0 | | Infinite | -0.026 | | | |
| Third lens element 3 | Object-side Surface 35 | 2.754 | 0.640 | 1.535 | 55.635 | 1.922 |
| | Image-side Surface 36 | -1.514 | 0.111 | | | |
| Fourth lens element 4 | Object-side Surface 45 | 3.105 | 0.201 | 1.661 | 20.412 | -8.978 |
| | Image-side Surface 46 | 1.992 | 0.114 | | | |
| Fifth lens element 5 | Object-side Surface 55 | -28.210 | 1.134 | 1.535 | 55.635 | 1.363 |
| | Image-side Surface 56 | -0.723 | 0.050 | | | |
| Sixth lens element 6 | Object-side Surface 65 | 1.125 | 0.231 | 1.661 | 20.412 | -1.982 |
| | Image-side Surface 66 | 0.558 | 0.491 | | | |
| Filter 9 | Object-side Surface 95 | Infinite | 0.210 | 1.560 | 51.300 | |
| | Image-side Surface 96 | Infinite | 0.868 | | | |
| | Image plane 99 | Infinite | | | | |

FIG. 8

| Surface | K | $a_2$ | $a_4$ | $a_6$ | $a_8$ |
|---|---|---|---|---|---|
| 15 | 1.399910E+01 | 0.000000E+00 | 1.040488E-01 | -6.135832E-02 | 3.169080E-02 |
| 16 | 0.000000E+00 | 0.000000E+00 | 6.201300E-02 | -6.980797E-02 | 2.577711E-02 |
| 25 | 0.000000E+00 | 0.000000E+00 | -1.727882E-01 | -7.631597E-03 | 7.105172E-02 |
| 26 | 3.165447E+00 | 0.000000E+00 | -1.291042E-01 | 5.793477E-02 | -1.355018E-01 |
| 35 | 2.042357E+01 | 0.000000E+00 | -1.981550E-01 | 6.802680E-01 | -1.319990E+01 |
| 36 | 8.388010E-01 | 0.000000E+00 | -6.389489E-01 | 1.694768E+00 | -4.176391E+00 |
| 45 | 0.000000E+00 | 0.000000E+00 | -9.520623E-01 | 1.633519E+00 | -2.780997E+00 |
| 46 | 1.940619E+00 | 0.000000E+00 | -4.545976E-01 | 3.399289E-01 | 3.316561E-01 |
| 55 | 9.900000E+01 | 0.000000E+00 | 1.333940E-01 | -1.595002E-01 | 7.879513E-02 |
| 56 | -4.503451E+00 | 0.000000E+00 | -2.479762E-01 | 1.379442E-01 | 1.468506E-01 |
| 65 | -3.198231E+00 | 0.000000E+00 | -5.055372E-01 | 5.618880E-01 | -6.595443E-01 |
| 66 | -3.799631E+00 | 0.000000E+00 | -2.184027E-01 | 1.490617E-01 | -1.155122E-01 |
| Surface | $a_{10}$ | $a_{12}$ | $a_{14}$ | $a_{16}$ | $a_{18}$ |
| 15 | -8.333547E-03 | 3.101572E-04 | 4.115551E-04 | -7.017962E-05 | 0.000000E+00 |
| 16 | 0.000000E+00 | 0.000000E+00 | 0.000000E+00 | 0.000000E+00 | 0.000000E+00 |
| 25 | 0.000000E+00 | 0.000000E+00 | 0.000000E+00 | 0.000000E+00 | 0.000000E+00 |
| 26 | 0.000000E+00 | 0.000000E+00 | 0.000000E+00 | 0.000000E+00 | 0.000000E+00 |
| 35 | 9.888568E+01 | -4.528872E+02 | 1.098454E+03 | -1.132803E+03 | 0.000000E+00 |
| 36 | 5.402502E+00 | -4.371363E-02 | -1.081385E+01 | 9.920383E+00 | 0.000000E+00 |
| 45 | 4.850311E+00 | -6.479871E+00 | 4.569033E+00 | -9.719523E-01 | 0.000000E+00 |
| 46 | -1.366859E+00 | 1.870570E+00 | -1.323710E+00 | 3.925475E-01 | 0.000000E+00 |
| 55 | 7.517590E-02 | -1.212087E-01 | 5.602996E-02 | -6.804383E-03 | 0.000000E+00 |
| 56 | -4.154266E-01 | 4.091861E-01 | -1.976698E-01 | 3.992247E-02 | 0.000000E+00 |
| 65 | 5.322966E-01 | -2.734150E-01 | 7.632853E-02 | -8.372503E-03 | 0.000000E+00 |
| 66 | 7.886479E-02 | -4.081450E-02 | 1.441723E-02 | -3.200488E-03 | 4.011551E-04 |
| Surface | $a_{20}$ | | | | |
| 15 | 0.000000E+00 | | | | |
| 16 | 0.000000E+00 | | | | |
| 25 | 0.000000E+00 | | | | |
| 26 | 0.000000E+00 | | | | |
| 35 | 0.000000E+00 | | | | |
| 36 | 0.000000E+00 | | | | |
| 45 | 0.000000E+00 | | | | |
| 46 | 0.000000E+00 | | | | |
| 55 | 0.000000E+00 | | | | |
| 56 | 0.000000E+00 | | | | |
| 65 | 0.000000E+00 | | | | |
| 66 | -2.174994E-05 | | | | |

FIG. 9

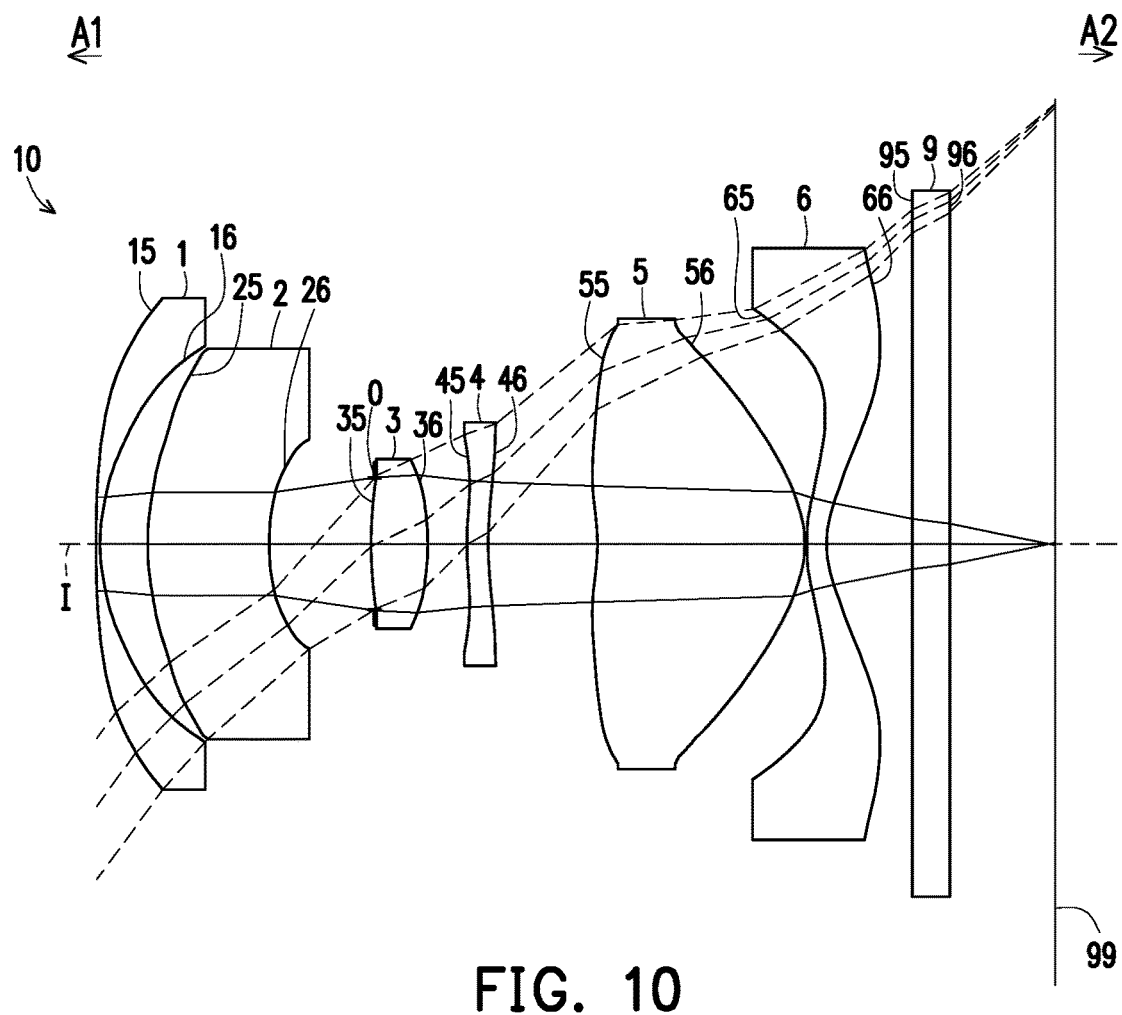
FIG. 10
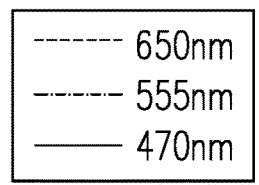
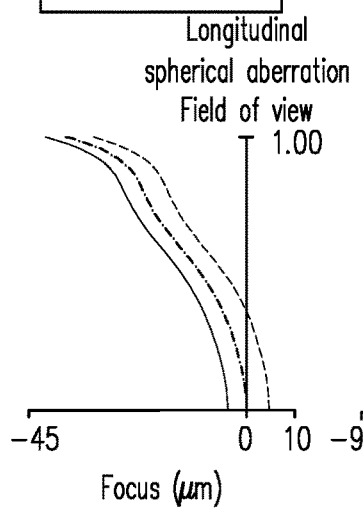
Longitudinal
spherical aberration
Field of view
FIG. 11A
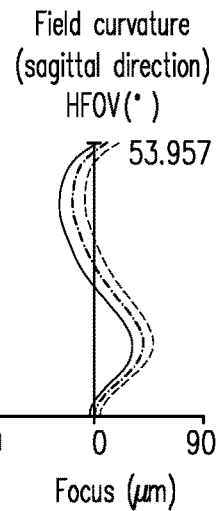
Field curvature
(sagittal direction)
HFOV(°)
FIG. 11B
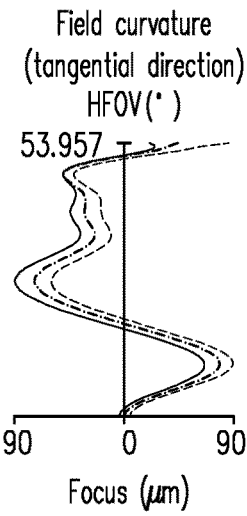
Field curvature
(tangential direction)
HFOV(°)
FIG. 11C
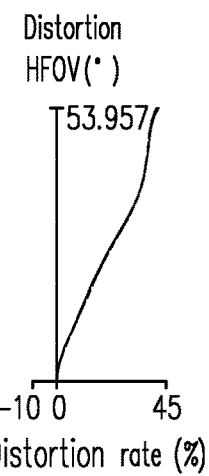
Distortion
HFOV(°)
FIG. 11D

| Second embodiment | | | | | | |
|---|---|---|---|---|---|---|
| Effective focal length= 1.298 mm, Half field of view= 53.957°, System length= 5.459 mm, F-number= 2.4, Image height= 2.520 mm | | | | | | |
| Element | Surface | Radius (mm) | Thickness (mm) | Refractive index | Abbe number | Focal length (mm) |
| Object | | Infinite | Infinite | | | |
| First lens element 1 | Object-side Surface 15 | 20.519 | 0.015 | 1.535 | 55.712 | -2.574 |
| | Image-side Surface 16 | 1.294 | 0.279 | | | |
| Second lens element 2 | Object-side Surface 25 | 1.602 | 0.682 | 1.535 | 55.712 | -46.764 |
| | Image-side Surface 26 | 1.282 | 0.606 | | | |
| Aperture 0 | | Infinite | -0.014 | | | |
| Third lens element 3 | Object-side Surface 35 | 2.807 | 0.312 | 1.535 | 55.635 | 1.882 |
| | Image-side Surface 36 | -1.515 | 0.233 | | | |
| Fourth lens element 4 | Object-side Surface 45 | 3.052 | 0.111 | 1.661 | 20.412 | -13.051 |
| | Image-side Surface 46 | 2.227 | 0.614 | | | |
| Fifth lens element 5 | Object-side Surface 55 | -34.803 | 1.189 | 1.535 | 55.635 | 1.134 |
| | Image-side Surface 56 | -0.605 | 0.023 | | | |
| Sixth lens element 6 | Object-side Surface 65 | 1.139 | 0.106 | 1.661 | 20.412 | -2.400 |
| | Image-side Surface 66 | 0.641 | 0.491 | | | |
| Filter 9 | Object-side Surface 95 | Infinite | 0.210 | 1.560 | 51.300 | |
| | Image-side Surface 96 | Infinite | 0.601 | | | |
| | Image plane 99 | Infinite | | | | |

FIG. 12

| Surface | K | $a_2$ | $a_4$ | $a_6$ | $a_8$ |
|---|---|---|---|---|---|
| 15 | 1.399910E+01 | 0.000000E+00 | 2.149460E-01 | -2.350263E-01 | 2.093009E-01 |
| 16 | 0.000000E+00 | 0.000000E+00 | -8.097914E-02 | 3.547552E-03 | 1.587595E-02 |
| 25 | 0.000000E+00 | 0.000000E+00 | -1.873693E-01 | 1.020565E-01 | -1.106853E-02 |
| 26 | 3.165447E+00 | 0.000000E+00 | 1.839861E-02 | -2.185770E-01 | 7.295347E-01 |
| 35 | 2.042357E+01 | 0.000000E+00 | -1.826517E-01 | -1.016901E+00 | 2.370751E+01 |
| 36 | 8.388010E-01 | 0.000000E+00 | -3.206344E-01 | -9.339968E-01 | 1.309020E+01 |
| 45 | 0.000000E+00 | 0.000000E+00 | -5.474658E-01 | -2.530429E+00 | 1.652474E+01 |
| 46 | 1.940619E+00 | 0.000000E+00 | -2.833665E-01 | -2.012992E+00 | 1.073141E+01 |
| 55 | 9.900000E+01 | 0.000000E+00 | 1.605716E-01 | -3.275887E-01 | 5.171192E-01 |
| 56 | -4.503451E+00 | 0.000000E+00 | -3.606669E-01 | 5.174991E-01 | -4.943692E-01 |
| 65 | -3.198231E+00 | 0.000000E+00 | -5.249649E-01 | 6.648483E-01 | -7.946375E-01 |
| 66 | -3.799631E+00 | 0.000000E+00 | -3.231986E-01 | 6.596797E-01 | -1.006615E+00 |
| Surface | $a_{10}$ | $a_{12}$ | $a_{14}$ | $a_{16}$ | $a_{18}$ |
| 15 | -1.138406E-01 | 3.666799E-02 | -6.479247E-03 | 5.025912E-04 | 0.000000E+00 |
| 16 | 0.000000E+00 | 0.000000E+00 | 0.000000E+00 | 0.000000E+00 | 0.000000E+00 |
| 25 | 0.000000E+00 | 0.000000E+00 | 0.000000E+00 | 0.000000E+00 | 0.000000E+00 |
| 26 | 0.000000E+00 | 0.000000E+00 | 0.000000E+00 | 0.000000E+00 | 0.000000E+00 |
| 35 | -3.017496E+02 | 1.766083E+03 | -4.952019E+03 | 5.305416E+03 | 0.000000E+00 |
| 36 | -7.605032E+01 | 2.136374E+02 | -2.919100E+02 | 1.569366E+02 | 0.000000E+00 |
| 45 | -4.339858E+01 | 5.907576E+01 | -3.962735E+01 | 1.012814E+01 | 0.000000E+00 |
| 46 | -2.317076E+01 | 2.607244E+01 | -1.521285E+01 | 3.662490E+00 | 0.000000E+00 |
| 55 | -5.615473E-01 | 3.855350E-01 | -1.406734E-01 | 2.083060E-02 | 0.000000E+00 |
| 56 | 2.680583E-01 | -5.145164E-02 | -2.231224E-02 | 1.124788E-02 | 0.000000E+00 |
| 65 | 5.328990E-01 | -2.017323E-01 | 4.098110E-02 | -3.346000E-03 | 0.000000E+00 |
| 66 | 9.147611E-01 | -5.162735E-01 | 1.848049E-01 | -4.093375E-02 | 5.123359E-03 |
| Surface | $a_{20}$ | | | | |
| 15 | 0.000000E+00 | | | | |
| 16 | 0.000000E+00 | | | | |
| 25 | 0.000000E+00 | | | | |
| 26 | 0.000000E+00 | | | | |
| 35 | 0.000000E+00 | | | | |
| 36 | 0.000000E+00 | | | | |
| 45 | 0.000000E+00 | | | | |
| 46 | 0.000000E+00 | | | | |
| 55 | 0.000000E+00 | | | | |
| 56 | 0.000000E+00 | | | | |
| 65 | 0.000000E+00 | | | | |
| 66 | -2.771228E-04 | | | | |

FIG. 13

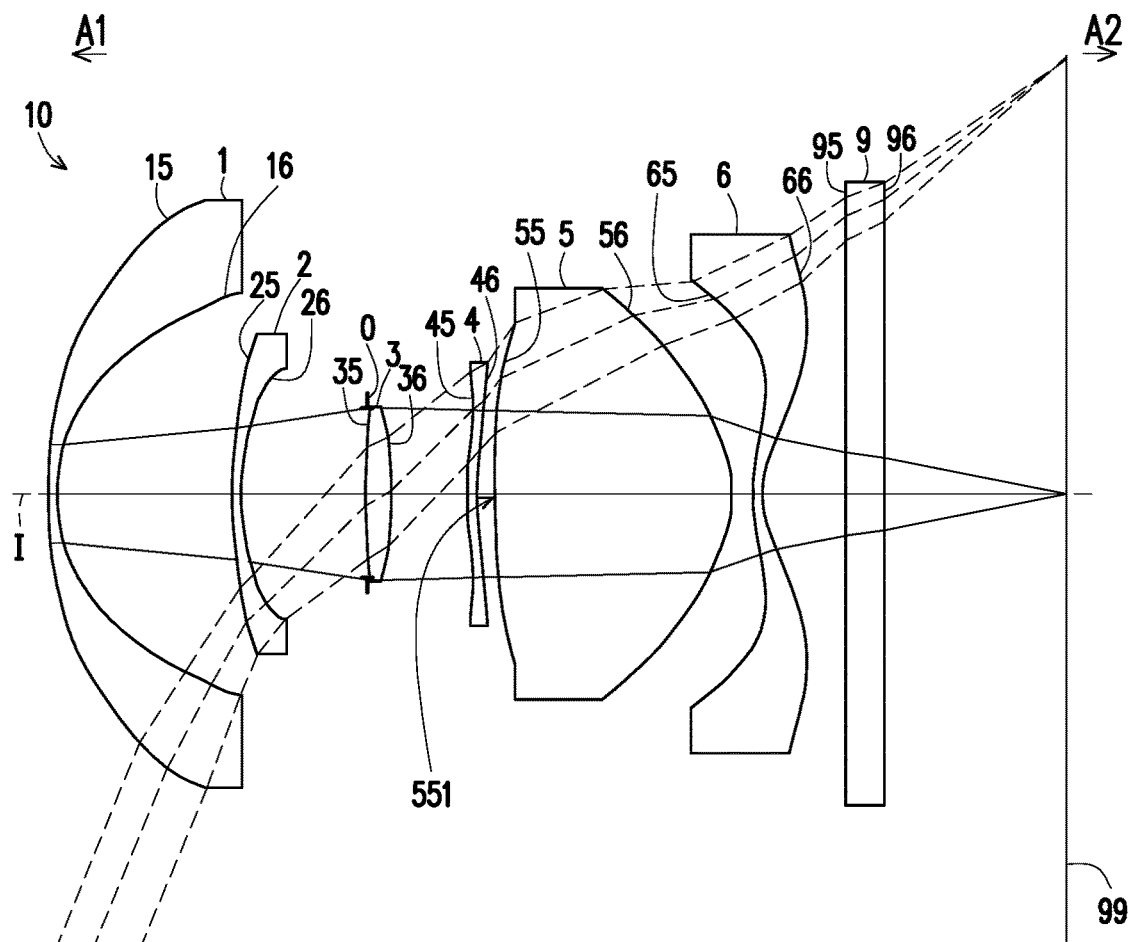
FIG. 14
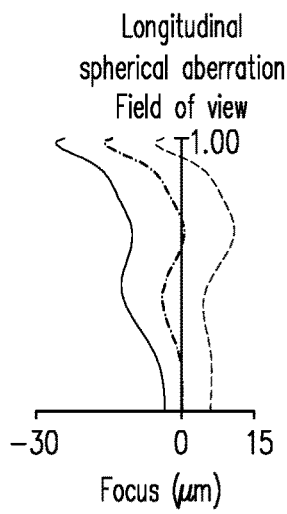
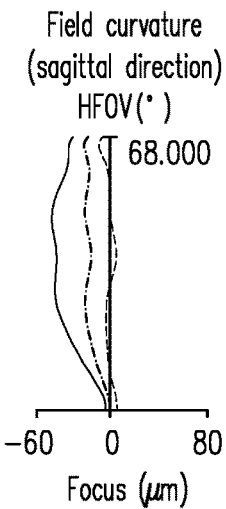
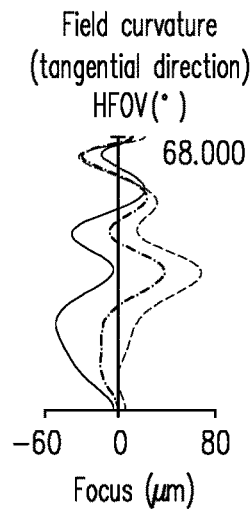
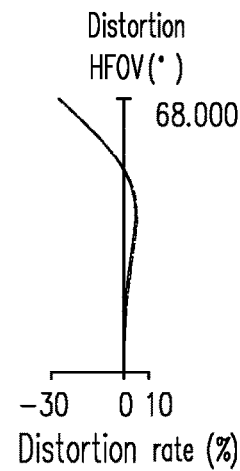
FIG. 15A  FIG. 15B  FIG. 15C  FIG. 15D

| Third embodiment | | | | | | |
|---|---|---|---|---|---|---|
| Effective focal length= 1.384 mm, Half field of view= 68.000°, System length= 5.813 mm, F-number= 2.4, Image height= 2.520 mm | | | | | | |
| Element | Surface | Radius (mm) | Thickness (mm) | Refractive index | Abbe number | Focal length (mm) |
| Object | | Infinite | Infinite | | | |
| First lens element 1 | Object-side Surface 15 | 6.632 | 0.040 | 1.535 | 55.712 | -2.832 |
| | Image-side Surface 16 | 1.234 | 1.012 | | | |
| Second lens element 2 | Object-side Surface 25 | 2.185 | 0.040 | 1.535 | 55.712 | -9.329 |
| | Image-side Surface 26 | 1.511 | 0.726 | | | |
| Aperture 0 | | Infinite | -0.003 | | | |
| Third lens element 3 | Object-side Surface 35 | 3.345 | 0.134 | 1.535 | 55.635 | 3.092 |
| | Image-side Surface 36 | -3.242 | 0.447 | | | |
| Fourth lens element 4 | Object-side Surface 45 | 1.728 | 0.044 | 1.661 | 20.412 | 15.391 |
| | Image-side Surface 46 | 2.057 | 0.117 | | | |
| Fifth lens element 5 | Object-side Surface 55 | 12.469 | 1.340 | 1.535 | 55.635 | 1.141 |
| | Image-side Surface 56 | -0.620 | 0.137 | | | |
| Sixth lens element 6 | Object-side Surface 65 | 1.359 | 0.040 | 1.661 | 20.412 | -1.514 |
| | Image-side Surface 66 | 0.573 | 0.491 | | | |
| Filter 9 | Object-side Surface 95 | Infinite | 0.210 | 1.560 | 51.300 | |
| | Image-side Surface 96 | Infinite | 1.039 | | | |
| | Image plane 99 | Infinite | | | | |

FIG. 16

| Surface | K | $a_2$ | $a_4$ | $a_6$ | $a_8$ |
|---|---|---|---|---|---|
| 15 | 1.399910E+01 | 0.000000E+00 | 3.464626E-01 | -3.906192E-01 | 2.988992E-01 |
| 16 | 0.000000E+00 | 0.000000E+00 | 2.975260E-01 | -1.257801E-01 | -1.068791E-02 |
| 25 | 0.000000E+00 | 0.000000E+00 | -3.557486E-01 | 4.752941E-01 | -1.874634E-01 |
| 26 | 3.165447E+00 | 0.000000E+00 | -3.473014E-01 | 3.311318E-01 | -3.451964E-02 |
| 35 | 2.042357E+01 | 0.000000E+00 | -3.342309E-01 | 1.294110E+00 | -2.196965E+01 |
| 36 | 8.388010E-01 | 0.000000E+00 | -3.774648E-01 | -1.846844E-01 | 3.021403E+00 |
| 45 | 0.000000E+00 | 0.000000E+00 | -7.991328E-01 | 2.310895E+00 | -1.247986E+01 |
| 46 | 1.940619E+00 | 0.000000E+00 | -7.117820E-01 | 3.245152E+00 | -1.596856E+01 |
| 55 | 9.900000E+01 | 0.000000E+00 | -1.573451E-01 | 1.547058E+00 | -3.963472E+00 |
| 56 | -4.503451E+00 | 0.000000E+00 | -4.826457E-02 | -7.049323E-01 | 1.806010E+00 |
| 65 | -3.198231E+00 | 0.000000E+00 | -3.019345E-01 | -5.988515E-01 | 1.256014E+00 |
| 66 | -3.799631E+00 | 0.000000E+00 | -1.194766E-01 | -4.241609E-01 | 8.426788E-01 |
| Surface | $a_{10}$ | $a_{12}$ | $a_{14}$ | $a_{16}$ | $a_{18}$ |
| 15 | -1.602629E-01 | 5.591988E-02 | -1.114078E-02 | 9.624374E-04 | 0.000000E+00 |
| 16 | 0.000000E+00 | 0.000000E+00 | 0.000000E+00 | 0.000000E+00 | 0.000000E+00 |
| 25 | 0.000000E+00 | 0.000000E+00 | 0.000000E+00 | 0.000000E+00 | 0.000000E+00 |
| 26 | 0.000000E+00 | 0.000000E+00 | 0.000000E+00 | 0.000000E+00 | 0.000000E+00 |
| 35 | 1.918608E+02 | -9.417787E+02 | 2.390331E+03 | -2.445131E+03 | 0.000000E+00 |
| 36 | -2.036546E+01 | 6.606898E+01 | -1.061622E+02 | 6.826332E+01 | 0.000000E+00 |
| 45 | 3.242617E+01 | -3.455679E+01 | 8.696671E+00 | 4.868267E+00 | 0.000000E+00 |
| 46 | 4.367211E+01 | -6.198334E+01 | 4.352825E+01 | -1.200081E+01 | 0.000000E+00 |
| 55 | 5.318805E+00 | -4.102799E+00 | 1.734600E+00 | -3.123314E-01 | 0.000000E+00 |
| 56 | -2.421639E+00 | 1.879114E+00 | -8.026284E-01 | 1.472954E-01 | 0.000000E+00 |
| 65 | -1.299658E+00 | 7.593137E-01 | -2.278634E-01 | 2.736133E-02 | 0.000000E+00 |
| 66 | -8.234773E-01 | 4.957765E-01 | -1.893308E-01 | 4.482936E-02 | -6.027839E-03 |
| Surface | $a_{20}$ | | | | |
| 15 | 0.000000E+00 | | | | |
| 16 | 0.000000E+00 | | | | |
| 25 | 0.000000E+00 | | | | |
| 26 | 0.000000E+00 | | | | |
| 35 | 0.000000E+00 | | | | |
| 36 | 0.000000E+00 | | | | |
| 45 | 0.000000E+00 | | | | |
| 46 | 0.000000E+00 | | | | |
| 55 | 0.000000E+00 | | | | |
| 56 | 0.000000E+00 | | | | |
| 65 | 0.000000E+00 | | | | |
| 66 | 3.519805E-04 | | | | |

FIG. 17

| Fourth embodiment | | | | | | |
|---|---|---|---|---|---|---|
| Effective focal length= 1.525 mm, Half field of view= 72.817°, System length= 4.851 mm, F-number= 2.4, Image height= 2.520 mm | | | | | | |
| Element | Surface | Radius (mm) | Thickness (mm) | Refractive index | Abbe number | Focal length (mm) |
| Object | | Infinite | Infinite | | | |
| First lens element 1 | Object-side Surface 15 | 27.287 | 0.100 | 1.535 | 55.712 | -2.330 |
| | Image-side Surface 16 | 1.194 | 0.238 | | | |
| Second lens element 2 | Object-side Surface 25 | 1.307 | 0.100 | 1.535 | 55.712 | -50.000 |
| | Image-side Surface 26 | 1.213 | 0.472 | | | |
| Aperture 0 | | Infinite | -0.024 | | | |
| Third lens element 3 | Object-side Surface 35 | 2.798 | 0.556 | 1.535 | 55.635 | 1.699 |
| | Image-side Surface 36 | -1.258 | 0.102 | | | |
| Fourth lens element 4 | Object-side Surface 45 | 5.126 | 0.383 | 1.661 | 20.412 | -5.043 |
| | Image-side Surface 46 | 1.971 | 0.107 | | | |
| Fifth lens element 5 | Object-side Surface 55 | 14.999 | 1.301 | 1.535 | 55.635 | 1.348 |
| | Image-side Surface 56 | -0.736 | 0.188 | | | |
| Sixth lens element 6 | Object-side Surface 65 | 1.355 | 0.308 | 1.661 | 20.412 | -1.757 |
| | Image-side Surface 66 | 0.571 | 0.491 | | | |
| Filter 9 | Object-side Surface 95 | Infinite | 0.210 | 1.560 | 51.300 | |
| | Image-side Surface 96 | Infinite | 0.317 | | | |
| | Image plane 99 | Infinite | | | | |

FIG. 20

| Surface | K | $a_2$ | $a_4$ | $a_6$ | $a_8$ |
|---|---|---|---|---|---|
| 15 | 1.399910E+01 | 0.000000E+00 | 1.484845E-01 | -1.320107E-01 | 1.644991E-01 |
| 16 | 0.000000E+00 | 0.000000E+00 | -9.598380E-02 | -3.157010E-02 | 6.535707E-02 |
| 25 | 0.000000E+00 | 0.000000E+00 | -2.150484E-01 | -5.312361E-02 | 2.007704E-01 |
| 26 | 3.165447E+00 | 0.000000E+00 | 4.533913E-03 | 1.464908E-01 | -4.243081E-01 |
| 35 | 2.042357E+01 | 0.000000E+00 | -1.394953E-01 | -1.097385E-01 | -2.230183E+00 |
| 36 | 8.388010E-01 | 0.000000E+00 | -1.032276E+00 | 5.416777E+00 | -2.496820E+01 |
| 45 | 0.000000E+00 | 0.000000E+00 | -1.273376E+00 | 3.654584E+00 | -9.206432E+00 |
| 46 | 1.940619E+00 | 0.000000E+00 | -4.738301E-01 | 6.786153E-01 | -7.375561E-01 |
| 55 | 9.900000E+01 | 0.000000E+00 | 1.223799E-01 | -1.828326E-01 | 1.918178E-01 |
| 56 | -4.503451E+00 | 0.000000E+00 | -5.222727E-01 | 1.081799E+00 | -1.574290E+00 |
| 65 | -3.198231E+00 | 0.000000E+00 | -6.154793E-01 | 9.113387E-01 | -1.082578E+00 |
| 66 | -3.799631E+00 | 0.000000E+00 | -2.165604E-01 | 2.505459E-01 | -2.262466E-01 |
| Surface | $a_{10}$ | $a_{12}$ | $a_{14}$ | $a_{16}$ | $a_{18}$ |
| 15 | -1.499965E-01 | 9.124295E-02 | -3.122386E-02 | 4.519050E-03 | 0.000000E+00 |
| 16 | 0.000000E+00 | 0.000000E+00 | 0.000000E+00 | 0.000000E+00 | 0.000000E+00 |
| 25 | 0.000000E+00 | 0.000000E+00 | 0.000000E+00 | 0.000000E+00 | 0.000000E+00 |
| 26 | 0.000000E+00 | 0.000000E+00 | 0.000000E+00 | 0.000000E+00 | 0.000000E+00 |
| 35 | 1.353179E+01 | -8.869172E+01 | 2.965498E+02 | -4.279193E+02 | 0.000000E+00 |
| 36 | 8.999354E+01 | -2.255001E+02 | 3.294916E+02 | -2.112010E+02 | 0.000000E+00 |
| 45 | 1.830411E+01 | -2.796619E+01 | 2.717914E+01 | -1.165495E+01 | 0.000000E+00 |
| 46 | 4.568476E-01 | -1.415228E-01 | 5.747566E-03 | -2.783942E-04 | 0.000000E+00 |
| 55 | -1.478086E-01 | 1.001374E-01 | -4.579706E-02 | 9.298148E-03 | 0.000000E+00 |
| 56 | 1.489289E+00 | -8.789676E-01 | 2.914142E-01 | -3.963854E-02 | 0.000000E+00 |
| 65 | 8.103742E-01 | -3.906526E-01 | 1.084291E-01 | -1.259132E-02 | 0.000000E+00 |
| 66 | 1.359048E-01 | -5.377578E-02 | 1.381777E-02 | -2.215015E-03 | 2.008355E-04 |
| Surface | $a_{20}$ | | | | |
| 15 | 0.000000E+00 | | | | |
| 16 | 0.000000E+00 | | | | |
| 25 | 0.000000E+00 | | | | |
| 26 | 0.000000E+00 | | | | |
| 35 | 0.000000E+00 | | | | |
| 36 | 0.000000E+00 | | | | |
| 45 | 0.000000E+00 | | | | |
| 46 | 0.000000E+00 | | | | |
| 55 | 0.000000E+00 | | | | |
| 56 | 0.000000E+00 | | | | |
| 65 | 0.000000E+00 | | | | |
| 66 | -7.837817E-06 | | | | |

FIG. 21

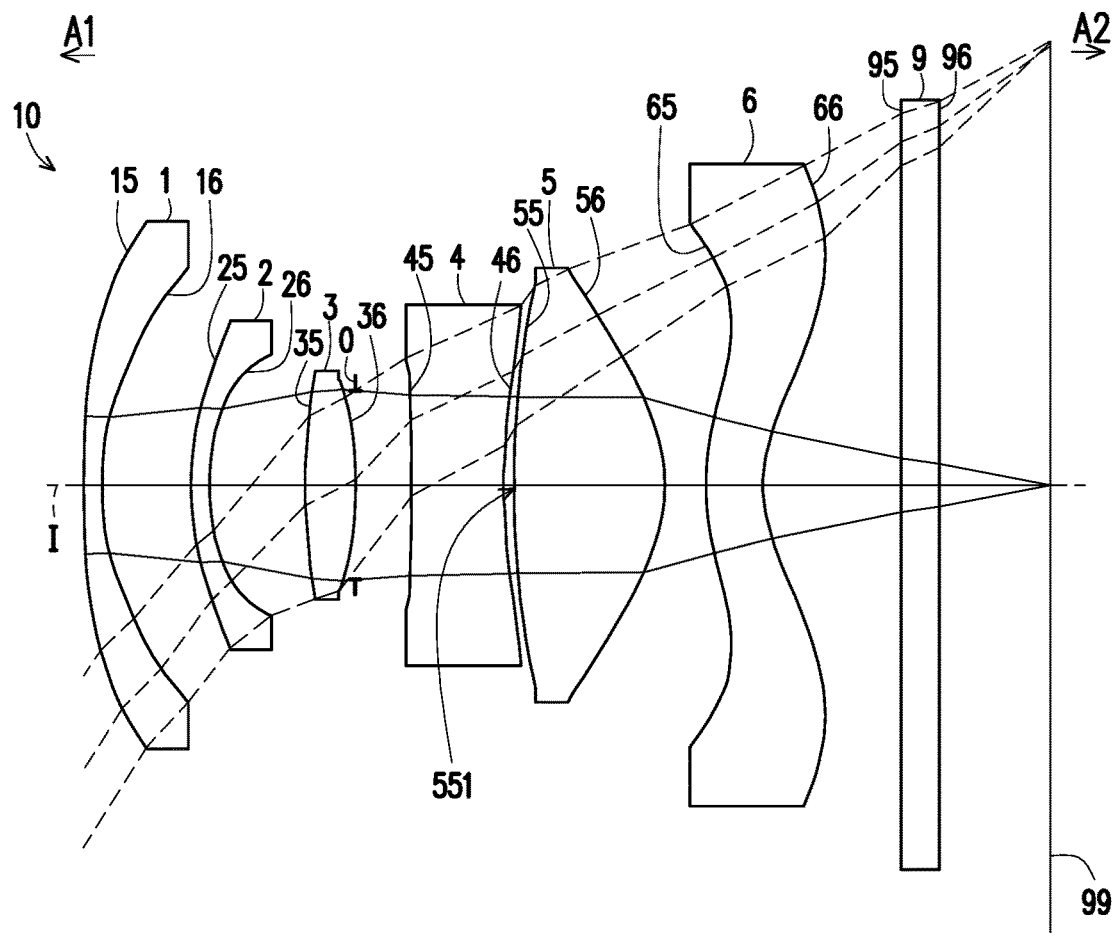
FIG. 22
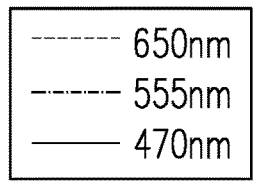
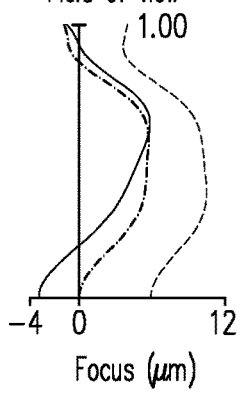
FIG. 23A
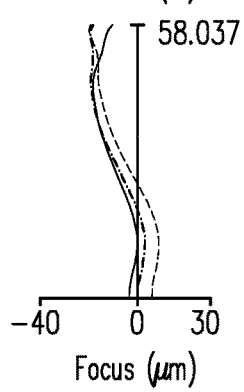
FIG. 23B
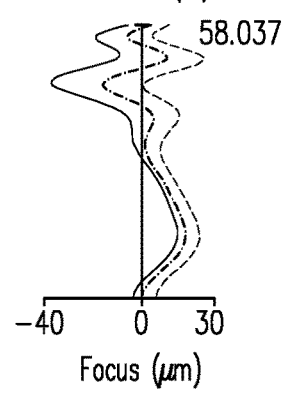
FIG. 23C
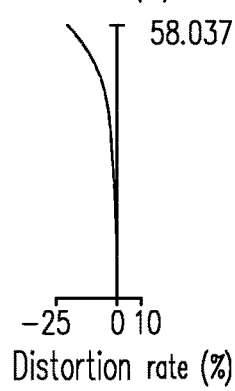
FIG. 23D

| Fifth embodiment | | | | | | |
|---|---|---|---|---|---|---|
| Effective focal length= 1.974 mm, Half field of view= 58.037°, System length= 5.528 mm, F-number= 2.4, Image height= 2.520 mm | | | | | | |
| Element | Surface | Radius (mm) | Thickness (mm) | Refractive index | Abbe number | Focal length (mm) |
| Object | | Infinite | Infinite | | | |
| First lens element 1 | Object-side Surface 15 | 7.200 | 0.100 | 1.535 | 55.712 | -3.705 |
| | Image-side Surface 16 | 1.551 | 0.515 | | | |
| Second lens element 2 | Object-side Surface 25 | 1.713 | 0.100 | 1.535 | 55.712 | -49.993 |
| | Image-side Surface 26 | 1.577 | 0.557 | | | |
| Third lens element 3 | Object-side Surface 35 | 4.175 | 0.280 | 1.535 | 55.635 | 2.950 |
| | Image-side Surface 36 | -2.487 | 0.000 | | | |
| Aperture 0 | | Infinite | 0.324 | | | |
| Fourth lens element 4 | Object-side Surface 45 | 14.805 | 0.527 | 1.661 | 20.412 | -7.041 |
| | Image-side Surface 46 | 3.515 | 0.067 | | | |
| Fifth lens element 5 | Object-side Surface 55 | 13.594 | 0.854 | 1.535 | 55.635 | 1.657 |
| | Image-side Surface 56 | -0.930 | 0.248 | | | |
| Sixth lens element 6 | Object-side Surface 65 | 1.475 | 0.315 | 1.661 | 20.412 | -3.149 |
| | Image-side Surface 66 | 0.793 | 0.800 | | | |
| Filter 9 | Object-side Surface 95 | Infinite | 0.210 | 1.560 | 51.300 | |
| | Image-side Surface 96 | Infinite | 0.629 | | | |
| | Image plane 99 | Infinite | | | | |

FIG. 24

| Surface | K | $a_2$ | $a_4$ | $a_6$ | $a_8$ |
|---|---|---|---|---|---|
| 15 | 1.399910E+01 | 0.000000E+00 | 4.312881E-02 | 7.869626E-03 | -3.597833E-02 |
| 16 | 0.000000E+00 | 0.000000E+00 | -4.313642E-02 | -1.618752E-02 | 4.275897E-03 |
| 25 | 0.000000E+00 | 0.000000E+00 | 2.988697E-03 | -1.358801E-01 | 5.201041E-02 |
| 26 | 3.165447E+00 | 0.000000E+00 | 1.919374E-01 | -7.726772E-02 | 2.126074E-01 |
| 35 | 2.042357E+01 | 0.000000E+00 | 2.295242E-02 | -2.710841E-02 | -4.440655E-02 |
| 36 | 8.388010E-01 | 0.000000E+00 | -8.966850E-02 | -4.549448E-01 | 4.510821E+00 |
| 45 | 0.000000E+00 | 0.000000E+00 | -1.541924E-01 | -1.335445E-01 | 9.592123E-01 |
| 46 | 1.940619E+00 | 0.000000E+00 | 4.974045E-03 | -2.879742E-01 | 5.331670E-01 |
| 55 | 9.900000E+01 | 0.000000E+00 | 2.106045E-01 | -4.407280E-01 | 5.740783E-01 |
| 56 | -4.503451E+00 | 0.000000E+00 | -2.210332E-01 | 3.352862E-01 | -4.045008E-01 |
| 65 | -3.198231E+00 | 0.000000E+00 | -1.331911E-01 | -4.817811E-02 | 6.828245E-02 |
| 66 | -3.799631E+00 | 0.000000E+00 | -1.167838E-02 | -1.946528E-01 | 2.864529E-01 |
| Surface | $a_{10}$ | $a_{12}$ | $a_{14}$ | $a_{16}$ | $a_{18}$ |
| 15 | 4.128529E-02 | -2.473683E-02 | 7.696120E-03 | -9.894726E-04 | 0.000000E+00 |
| 16 | 0.000000E+00 | 0.000000E+00 | 0.000000E+00 | 0.000000E+00 | 0.000000E+00 |
| 25 | 0.000000E+00 | 0.000000E+00 | 0.000000E+00 | 0.000000E+00 | 0.000000E+00 |
| 26 | 0.000000E+00 | 0.000000E+00 | 0.000000E+00 | 0.000000E+00 | 0.000000E+00 |
| 35 | -7.457417E-02 | -2.162107E+00 | 8.285658E+00 | -1.096716E+01 | 0.000000E+00 |
| 36 | -2.624310E+01 | 8.179259E+01 | -1.328735E+02 | 8.626712E+01 | 0.000000E+00 |
| 45 | -3.029802E+00 | 5.200898E+00 | -4.621847E+00 | 1.536030E+00 | 0.000000E+00 |
| 46 | -5.592954E-01 | 3.274692E-01 | -7.259911E-02 | -4.110786E-03 | 0.000000E+00 |
| 55 | -4.977803E-01 | 2.655067E-01 | -7.582418E-02 | 8.383499E-03 | 0.000000E+00 |
| 56 | 3.810008E-01 | -2.236907E-01 | 7.002246E-02 | -9.040223E-03 | 0.000000E+00 |
| 65 | -3.125028E-02 | -4.772945E-03 | 8.060786E-03 | -1.658457E-03 | 0.000000E+00 |
| 66 | -2.435587E-01 | 1.328102E-01 | -4.670834E-02 | 1.020015E-02 | -1.251036E-03 |
| Surface | $a_{20}$ | | | | |
| 15 | 0.000000E+00 | | | | |
| 16 | 0.000000E+00 | | | | |
| 25 | 0.000000E+00 | | | | |
| 26 | 0.000000E+00 | | | | |
| 35 | 0.000000E+00 | | | | |
| 36 | 0.000000E+00 | | | | |
| 45 | 0.000000E+00 | | | | |
| 46 | 0.000000E+00 | | | | |
| 55 | 0.000000E+00 | | | | |
| 56 | 0.000000E+00 | | | | |
| 65 | 0.000000E+00 | | | | |
| 66 | 6.546201E-05 | | | | |

FIG. 25

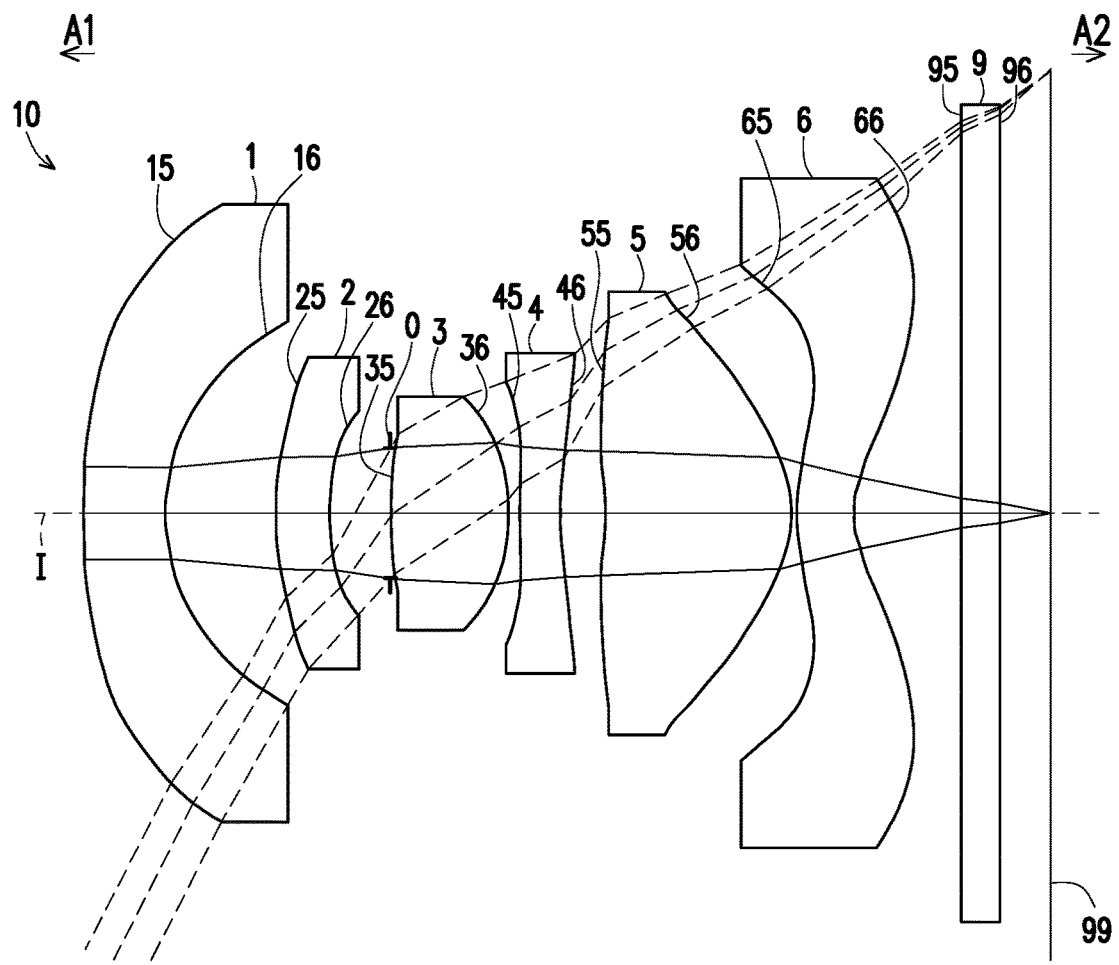
FIG. 26
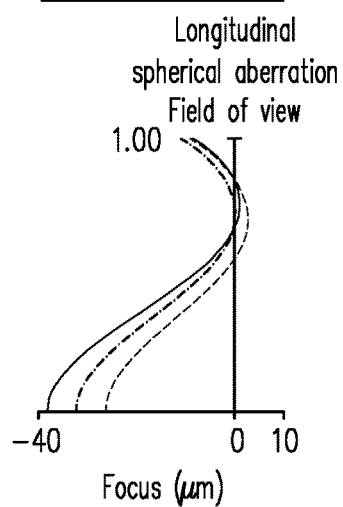
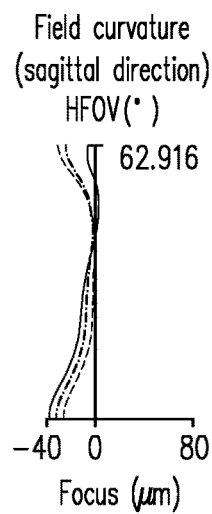
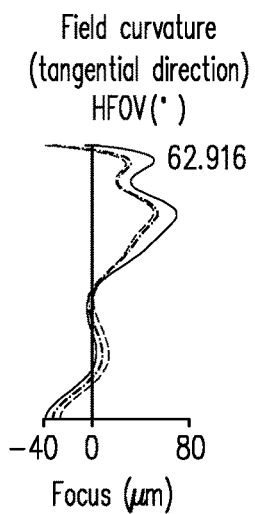
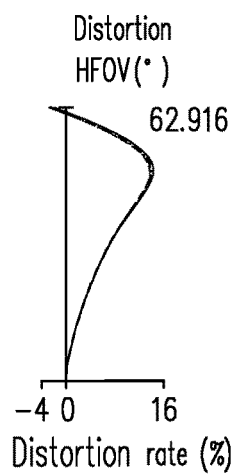
FIG. 27A  FIG. 27B  FIG. 27C  FIG. 27D

| Sixth embodiment ||||||
|---|---|---|---|---|---|
| Effective focal length= 1.308 mm, Half field of view= 62.916°, System length= 5.455 mm, F-number= 2.4, Image height= 2.520 mm ||||||
| Element | Surface | Radius (mm) | Thickness (mm) | Refractive index | Abbe number | Focal length (mm) |
| Object | | Infinite | Infinite | | | |
| First lens element 1 | Object-side Surface 15 | 6.591 | 0.456 | 1.535 | 55.712 | -2.853 |
| | Image-side Surface 16 | 1.213 | 0.628 | | | |
| Second lens element 2 | Object-side Surface 25 | 1.770 | 0.292 | 1.535 | 55.712 | -12.795 |
| | Image-side Surface 26 | 1.326 | 0.350 | | | |
| Aperture 0 | | Infinite | 0.005 | | | |
| Third lens element 3 | Object-side Surface 35 | 2.564 | 0.651 | 1.535 | 55.635 | 1.782 |
| | Image-side Surface 36 | -1.389 | 0.076 | | | |
| Fourth lens element 4 | Object-side Surface 45 | 3.379 | 0.221 | 1.661 | 20.412 | -8.419 |
| | Image-side Surface 46 | 2.055 | 0.240 | | | |
| Fifth lens element 5 | Object-side Surface 55 | -73.842 | 1.078 | 1.535 | 55.635 | 1.277 |
| | Image-side Surface 56 | -0.682 | 0.032 | | | |
| Sixth lens element 6 | Object-side Surface 65 | 1.139 | 0.311 | 1.661 | 20.412 | -1.854 |
| | Image-side Surface 66 | 0.528 | 0.617 | | | |
| Filter 9 | Object-side Surface 95 | Infinite | 0.210 | 1.560 | 51.300 | |
| | Image-side Surface 96 | Infinite | 0.288 | | | |
| | Image plane 99 | Infinite | | | | |

FIG. 28

| Surface | K | $a_2$ | $a_4$ | $a_6$ | $a_8$ |
|---|---|---|---|---|---|
| 15 | 4.775258E+00 | 0.000000E+00 | 1.046179E-01 | -6.358195E-02 | 3.905132E-02 |
| 16 | 0.000000E+00 | 0.000000E+00 | 5.426060E-02 | -3.727491E-02 | 0.000000E+00 |
| 25 | 0.000000E+00 | 0.000000E+00 | -1.830495E-01 | 1.236360E-01 | 0.000000E+00 |
| 26 | 3.133379E+00 | 0.000000E+00 | -1.213504E-01 | 9.120090E-02 | 0.000000E+00 |
| 35 | 1.750185E+01 | 0.000000E+00 | -1.865138E-01 | -3.083949E-01 | -9.344971E-01 |
| 36 | 9.823496E-01 | 0.000000E+00 | -5.645524E-01 | 7.142526E-01 | 1.950951E+00 |
| 45 | 0.000000E+00 | 0.000000E+00 | -9.195121E-01 | 1.133458E+00 | -6.044078E-01 |
| 46 | 1.781231E+00 | 0.000000E+00 | -4.208935E-01 | 1.010030E-01 | 1.109784E+00 |
| 55 | 4.965704E+02 | 0.000000E+00 | 1.514769E-01 | -3.399747E-01 | 5.791716E-01 |
| 56 | -4.377444E+00 | 0.000000E+00 | -3.871589E-01 | 6.644357E-01 | -7.853203E-01 |
| 65 | -2.826989E+00 | 0.000000E+00 | -6.156387E-01 | 7.950981E-01 | -8.986046E-01 |
| 66 | -3.868588E+00 | 0.000000E+00 | -2.586478E-01 | 2.648498E-01 | -2.126033E-01 |
| Surface | $a_{10}$ | $a_{12}$ | $a_{14}$ | $a_{16}$ | $a_{18}$ |
| 15 | -1.541813E-02 | 3.554379E-03 | -3.380869E-04 | 0.000000E+00 | 0.000000E+00 |
| 16 | 0.000000E+00 | 0.000000E+00 | 0.000000E+00 | 0.000000E+00 | 0.000000E+00 |
| 25 | 0.000000E+00 | 0.000000E+00 | 0.000000E+00 | 0.000000E+00 | 0.000000E+00 |
| 26 | 0.000000E+00 | 0.000000E+00 | 0.000000E+00 | 0.000000E+00 | 0.000000E+00 |
| 35 | 7.640030E+00 | -1.121654E+02 | 5.900346E+02 | -1.095523E+03 | 0.000000E+00 |
| 36 | -1.761942E+01 | 5.917758E+01 | -1.108463E+02 | 8.722923E+01 | 0.000000E+00 |
| 45 | 1.313759E+00 | -7.239360E+00 | 1.004469E+01 | -3.138540E+00 | 0.000000E+00 |
| 46 | -2.611759E+00 | 2.747604E+00 | -1.486625E+00 | 3.622403E-01 | 0.000000E+00 |
| 55 | -7.187676E-01 | 5.567454E-01 | -2.300158E-01 | 3.933518E-02 | 0.000000E+00 |
| 56 | 6.102482E-01 | -2.985874E-01 | 7.268740E-02 | -3.026292E-03 | 0.000000E+00 |
| 65 | 6.968161E-01 | -3.608545E-01 | 1.069211E-01 | -1.298154E-02 | 0.000000E+00 |
| 66 | 1.187680E-01 | -4.525268E-02 | 1.123181E-02 | -1.683761E-03 | 1.316860E-04 |
| Surface | $a_{20}$ | | | | |
| 15 | 0.000000E+00 | | | | |
| 16 | 0.000000E+00 | | | | |
| 25 | 0.000000E+00 | | | | |
| 26 | 0.000000E+00 | | | | |
| 35 | 0.000000E+00 | | | | |
| 36 | 0.000000E+00 | | | | |
| 45 | 0.000000E+00 | | | | |
| 46 | 0.000000E+00 | | | | |
| 55 | 0.000000E+00 | | | | |
| 56 | 0.000000E+00 | | | | |
| 65 | 0.000000E+00 | | | | |
| 66 | -3.586212E-06 | | | | |

FIG. 29

| Condition expression | First embodiment | Second embodiment | Third embodiment | Fourth embodiment | Fifth embodiment | Sixth embodiment |
|---|---|---|---|---|---|---|
| T1 | 0.424 | 0.015 | 0.040 | 0.100 | 0.100 | 0.456 |
| G12 | 0.445 | 0.279 | 1.012 | 0.238 | 0.515 | 0.628 |
| T2 | 0.354 | 0.682 | 0.040 | 0.100 | 0.100 | 0.292 |
| G23 | 0.333 | 0.592 | 0.723 | 0.449 | 0.557 | 0.356 |
| T3 | 0.640 | 0.312 | 0.134 | 0.556 | 0.280 | 0.651 |
| G34 | 0.111 | 0.233 | 0.447 | 0.102 | 0.324 | 0.076 |
| T4 | 0.201 | 0.111 | 0.044 | 0.383 | 0.527 | 0.221 |
| G45 | 0.114 | 0.614 | 0.117 | 0.107 | 0.067 | 0.240 |
| T5 | 1.134 | 1.189 | 1.340 | 1.301 | 0.854 | 1.078 |
| G56 | 0.050 | 0.023 | 0.137 | 0.188 | 0.248 | 0.032 |
| T6 | 0.231 | 0.106 | 0.040 | 0.308 | 0.315 | 0.311 |
| G6F | 0.491 | 0.491 | 0.491 | 0.491 | 0.800 | 0.617 |
| TF | 0.210 | 0.210 | 0.210 | 0.210 | 0.210 | 0.210 |
| GFP | 0.868 | 0.601 | 1.039 | 0.317 | 0.629 | 0.288 |
| AAG | 1.054 | 1.741 | 2.436 | 1.084 | 1.712 | 1.332 |
| ALT | 2.985 | 2.415 | 1.638 | 2.749 | 2.177 | 3.009 |
| BFL | 1.569 | 1.302 | 1.740 | 1.018 | 1.639 | 1.115 |
| TTL | 5.608 | 5.459 | 5.813 | 4.851 | 5.528 | 5.455 |
| TL | 4.038 | 4.156 | 4.074 | 3.833 | 3.889 | 4.340 |
| EFL | 1.686 | 1.298 | 1.384 | 1.525 | 1.974 | 1.308 |
| V1 | 55.712 | 55.712 | 55.712 | 55.712 | 55.712 | 55.712 |
| V2 | 55.712 | 55.712 | 55.712 | 55.712 | 55.712 | 55.712 |
| V3 | 55.635 | 55.635 | 55.635 | 55.635 | 55.635 | 55.635 |
| V4 | 20.412 | 20.412 | 20.412 | 20.412 | 20.412 | 20.412 |
| V5 | 55.635 | 55.635 | 55.635 | 55.635 | 55.635 | 55.635 |
| V6 | 20.412 | 20.412 | 20.412 | 20.412 | 20.412 | 20.412 |

FIG. 30

| Condition expression | First embodiment | Second embodiment | Third embodiment | Fourth embodiment | Fifth embodiment | Sixth embodiment |
|---|---|---|---|---|---|---|
| V2+V3 | 111.347 | 111.347 | 111.347 | 111.347 | 111.347 | 111.347 |
| (T1+G12+T5+G56)/(T2+G23) | 2.987 | 1.182 | 3.315 | 3.332 | 2.614 | 3.387 |
| (T1+G12+T5+G56+T6)/(T2+G23) | 3.323 | 1.265 | 3.368 | 3.894 | 3.094 | 3.868 |
| (T1+G12)/(T2+G34) | 1.871 | 0.321 | 2.160 | 1.677 | 1.449 | 2.946 |
| (T1+G12+T3)/(T2+G34+G45) | 2.608 | 0.396 | 1.963 | 2.900 | 1.822 | 2.854 |
| TL/BFL | 2.573 | 3.192 | 2.341 | 3.764 | 2.373 | 3.894 |
| EFL/AAG | 1.600 | 0.746 | 0.568 | 1.407 | 1.153 | 0.982 |
| ALT/EFL | 1.770 | 1.861 | 1.183 | 1.803 | 1.103 | 2.300 |
| TTL/EFL | 3.326 | 4.205 | 4.200 | 3.182 | 2.800 | 4.170 |
| ALT/BFL | 1.902 | 1.855 | 0.941 | 2.700 | 1.328 | 2.699 |
| AAG/BFL | 0.671 | 1.337 | 1.400 | 1.064 | 1.045 | 1.195 |
| T6/T4 | 1.151 | 0.950 | 0.914 | 0.805 | 0.598 | 1.409 |
| T3/G23 | 1.920 | 0.527 | 0.185 | 1.240 | 0.504 | 1.829 |
| (T1+T3+T6)/(T5+G56) | 1.094 | 0.357 | 0.145 | 0.648 | 0.631 | 1.277 |
| TTL/(T4+T5) | 4.200 | 4.197 | 4.200 | 2.880 | 4.002 | 4.199 |
| AAG/(G23+G45) | 2.354 | 1.444 | 2.900 | 1.951 | 2.743 | 2.235 |
| TL/(T4+G45+T5+G56+T6) | 2.334 | 2.035 | 2.428 | 1.675 | 1.933 | 2.306 |
| (T2+G34+T4+T6)/(G12+G23) | 1.151 | 1.300 | 0.329 | 1.300 | 1.182 | 0.915 |
| (T1+T2+T6)/(G23+T3) | 1.036 | 0.888 | 0.140 | 0.506 | 0.615 | 1.052 |
| ALT/T5 | 2.631 | 2.031 | 1.222 | 2.112 | 2.549 | 2.790 |
| (T1+T4+G45+T6)/(G12+G34+G56) | 1.600 | 1.581 | 0.151 | 1.700 | 0.928 | 1.668 |

FIG. 31

OPTICAL IMAGING LENS

CROSS REFERENCE TO RELATED APPLICATION

This application claims the priority benefit of China application serial no. 201810295861.5, filed on Mar. 30, 2018. The entirety of the above-mentioned patent application is hereby incorporated by reference herein and made a part of specification.

BACKGROUND OF THE INVENTION

Field of the Invention

The invention is related to an optical element, and particularly to an optical imaging lens.

Description of Related Art

Dimension of consumer electronics is ever-changing, and demands for compact and slim products have been increased; therefore, it is inevitable that the specification of essential component of electronic products such as optical lens must be improved continuously in order to meet consumers' need. The most important characteristic of optical lens lies in imaging quality and size; additionally, it is increasingly important to enhance field of view. Accordingly, in the field of optical lens design, apart from pursing slimness of lens, the imaging quality and performance of lens need to be taken into consideration as well.

However, the design of an optical lens with good imaging quality and miniaturized size cannot be achieved by simply reducing the proportion of lens with good imaging quality. The design process not only involves property of materials but also actual manufacturing issues such as production and yield rate. Therefore, it has been an objective for practitioners in the field to find out how to fabricate an optical lens with good imaging quality by taking into consideration of the factors mentioned above.

SUMMARY OF THE INVENTION

The invention provides an optical imaging lens which has good imaging quality.

An embodiment of the invention provides an optical imaging lens including a first lens element, a second lens element, a third lens element, a fourth lens element, a fifth lens element and a sixth lens element arranged in a sequence from an object side to an image side along an optical axis. Each of the first through the sixth lens elements includes an object-side surface facing the object side and allowing imaging rays to pass through and an image-side surface facing the image side and allowing the imaging rays to pass through. The first lens element has negative refracting power. The second lens element has negative refracting power, and a periphery region of the object-side surface of the second lens element is convex. An optical axis region of the image-side surface of the fourth lens element is concave, an optical axis region of the image-side surface of the sixth lens element is concave, and a periphery region of the image-side surface of the sixth lens element is convex. Lens elements of the optical imaging lens having refracting power are only the above-mentioned six lens elements, and the optical imaging lens satisfies V2+V3≥100.000 and (T1+G12+T5+G56)/(T2+G23)≤3.400, wherein V2 is an Abbe number of the second lens element, V3 is an Abbe number of the third lens element, T1 is a thickness of the first lens element along the optical axis, G12 is an air gap between the first lens element and the second lens element along the optical axis, T5 is a thickness of the fifth lens element along the optical axis, G56 is an air gap between the fifth lens element and the sixth lens element along the optical axis, T2 is a thickness of the second lens element along the optical axis, and G23 is an air gap between the second lens element and the third lens element along the optical axis.

An embodiment of the invention provides an optical imaging lens, including a first lens element, a second lens element, a third lens element, a fourth lens element, a fifth lens element and a sixth lens element arranged in sequence from an object side to an image side along an optical axis. Each of the first lens element through the sixth lens element includes an object-side surface facing the object side and allowing imaging rays to pass through as well as an image-side surface facing the imaging side and allowing the imaging rays to pass through. The first lens element has negative refracting power. The second lens element has negative refracting power, and a periphery region of the object-side surface of the second lens element is convex. An optical axis region of the image-side surface of the fourth lens element is concave, an optical axis region of the image-side surface of the sixth lens element is concave, and a periphery region of the image-side surface of the sixth lens element is convex. Lens elements of the optical imaging lens having refracting power are only the above-mentioned six lens elements, and the optical imaging lens satisfies V2+V3≥100.000 and (T1+G12+T5+G56+T6)/(T2+G23) ≤3.900, wherein V2 is an Abbe number of the second lens element, V3 is an Abbe number of the third lens element, T1 is a thickness of the first lens element along the optical axis, G12 is an air gap between the first lens element and the second lens element along the optical axis, T5 is a thickness of the fifth lens element along the optical axis, G56 is an air gap between the fifth lens element and the sixth lens element along the optical axis, T6 is a thickness of the sixth lens element along the optical axis, T2 is a thickness of the second lens element along the optical axis, and G23 is an air gap between the second lens element and the third lens element along the optical axis.

Based on the above, according to the embodiment of the invention, the advantageous effect of the optical imaging lens is that, by satisfying the number of the lens elements having refracting power, with the first and second lens elements having negative refracting power, the surface design of the lens elements while satisfying the condition expressions, the optical imaging lens described in the embodiment of the invention can achieve good imaging quality.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view illustrating an optical imaging lens according to a second embodiment of the invention.

FIG. 11A to FIG. 11D are diagrams illustrating longitudinal spherical aberration and other aberrations of the optical imaging lens according to the second embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view illustrating an optical imaging lens according to a third embodiment of the invention.

FIG. 15A to FIG. 15D are diagrams illustrating longitudinal spherical aberration and other aberrations of the optical imaging lens according to the third embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 22 is a schematic view illustrating an optical imaging lens according to a fifth embodiment of the invention.

FIG. 23A to FIG. 23D are diagrams illustrating longitudinal spherical aberration and other aberrations of the optical imaging lens according to the fifth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 26 is a schematic view illustrating an optical imaging lens according to a sixth embodiment of the invention.

FIG. 27A to FIG. 27D are diagrams illustrating longitudinal spherical aberration and other aberrations of the optical imaging lens according to the sixth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 and FIG. 31 show important parameters and relation values thereof pertaining to the optical imaging lenses according to the first through the sixth embodiments of the invention.

DESCRIPTION OF THE EMBODIMENTS

Figure 1:
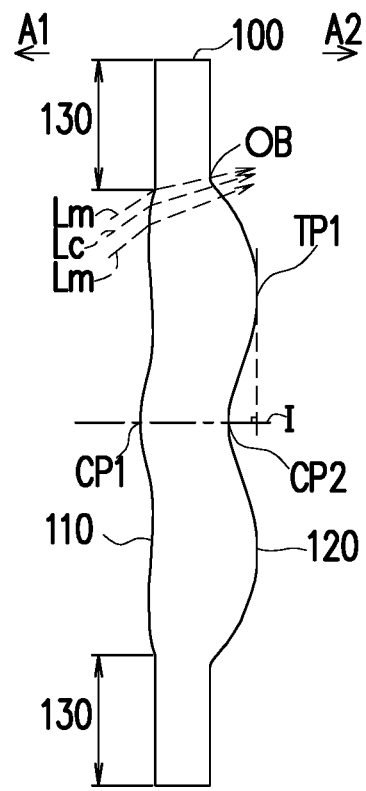
FIG. 1 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
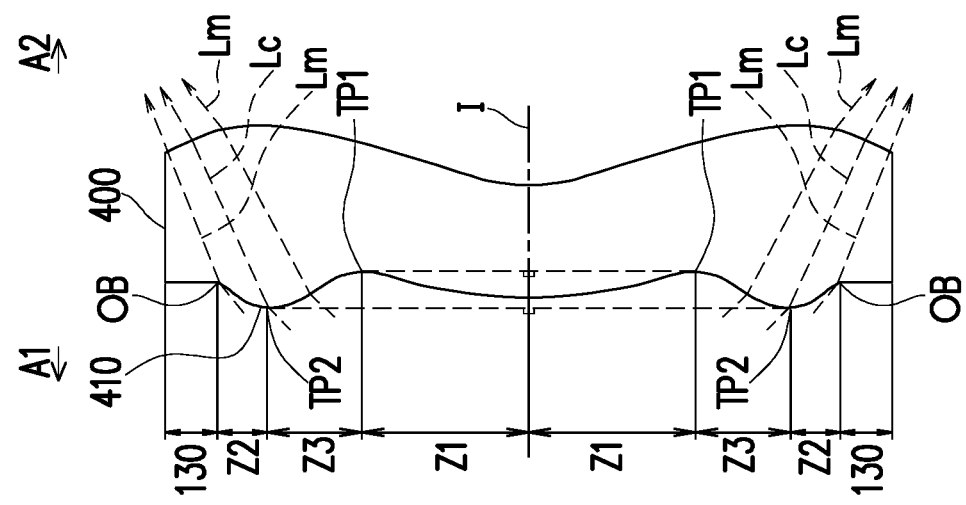
FIG. 4 is a schematic view illustrating a surface structure of a lens element according to a second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
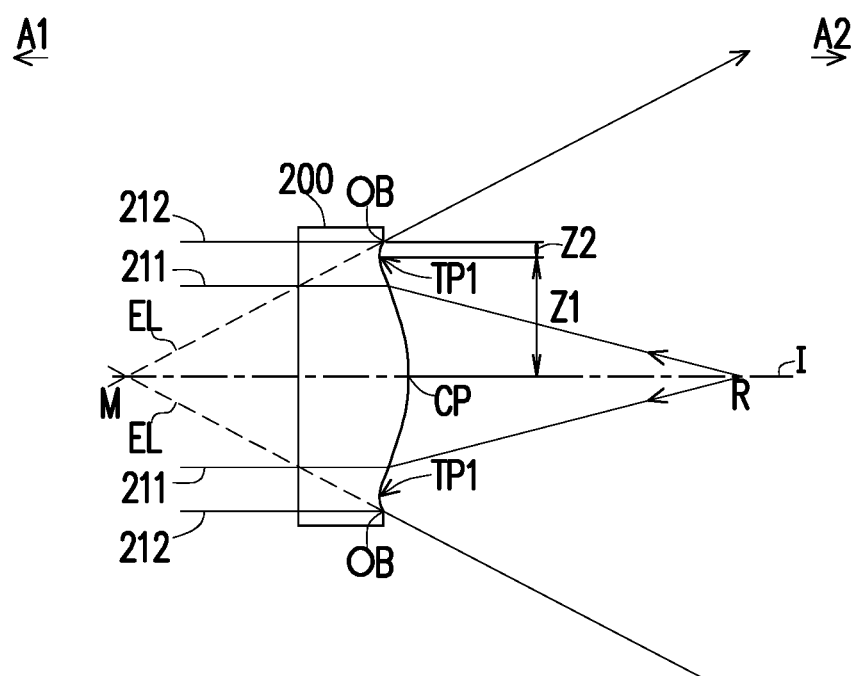
FIG. 2 is a schematic view illustrating a concave and convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
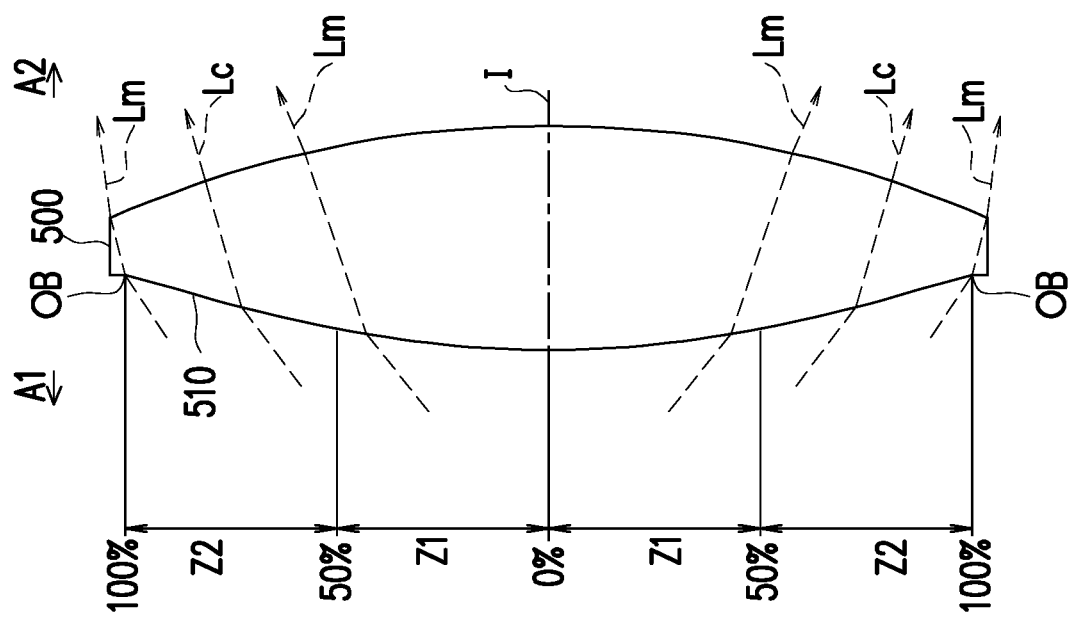
FIG. 5 is a schematic view illustrating a surface structure of a lens element according to a third example.
Figure 3:
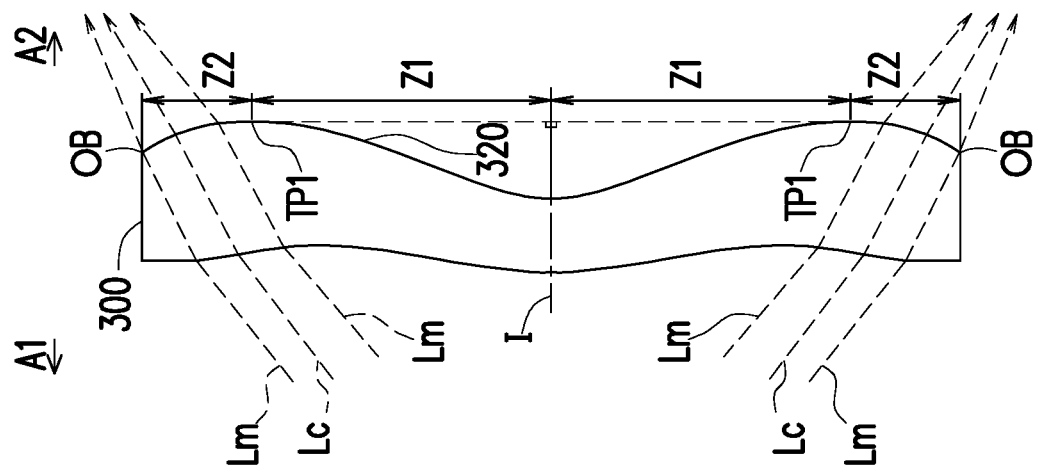
FIG. 3 is a schematic view illustrating a surface structure of a lens element according to a first example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-

100% of the distance between the optical axis I and the optical boundary OB of the surface of the lens element. Referring to lens element 500 illustrated in FIG. 5, the optical axis region Z1 of the object-side surface 510 is defined between the optical axis and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
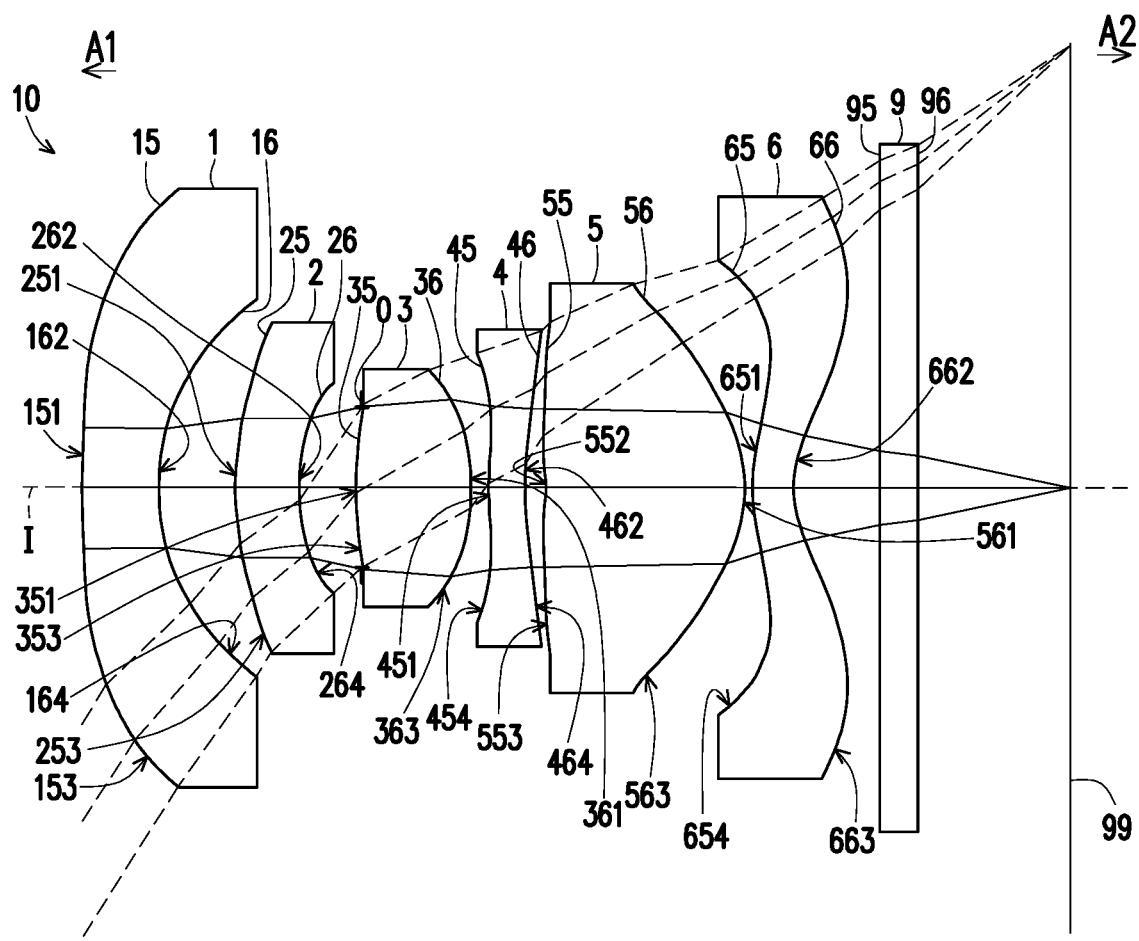
FIG. 6 is a schematic view illustrating an optical imaging lens according to a first embodiment of the invention.

FIG. 6 is a schematic view illustrating an optical imaging lens according to a first embodiment of the invention. FIG. 7A to FIG. 7D are diagrams illustrating longitudinal spherical aberration and other aberrations of the optical imaging lens according to the first embodiment of the invention. Referring to FIG. 6, according to a first embodiment of the invention, an optical imaging lens 10 includes a first lens element 1, a second lens element 2, an aperture 0, a third lens element 3, a fourth lens element 4, a fifth lens element 5, a sixth lens element 6 and a filter 9 arranged in a sequence from an object side A1 to an image side A2 along an optical axis I of the optical imaging lens 10. When a light emitted by an object to be photographed enters the optical imaging lens 10 and passes through the first lens element 1, the second lens element 2, the aperture 0, the third lens element 3, the fourth lens element 4, the fifth lens element 5, the sixth lens element 6 and the filter 9 in sequence, an image is formed on an image plane 99. The filter 9 is, for example, an infrared cut-off filter disposed between the sixth lens element 6 and the image plane 99. It should be noted that the object side A1 is a side facing the object to be photographed, and the image side A2 is a side facing the image plane 99.

In the embodiment, each of the first lens element 1, the second lens element 2, the third lens element 3, the fourth lens element 4, the fifth lens element 5, the sixth lens element 6 and the filter 9 of the optical imaging lens 10 has an object-side surface 15, 25, 35, 45, 55, 65, 95 facing the object side A1 and allowing imaging rays to pass through as well as an image-side surface 16, 26, 36, 46, 56, 66, 96 facing the image side A2 and allowing the imaging rays to pass through. In the embodiment, the aperture 0 is disposed between the second lens element 2 and the third lens element 3.

The first lens element 1 has negative refracting power. The material of the first lens element 1 is plastic. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In the embodiment, the object-side surface 15 and the image-side surface 16 of the first lens element 1 are aspheric surfaces.

The second lens element 2 has negative refracting power. The material of the second lens element 2 is plastic. An optical axis region 251 of the object-side surface 25 of the second lens element 2 is convex, and a periphery region 253 thereof is convex. An optical axis region 262 of the image-side surface 26 of the second lens element 2 is concave, and a periphery region 264 thereof is concave. In the embodiment, the object-side surface 25 and the image-side surface 26 of the second lens element 2 are aspheric surfaces.

The third lens element 3 has positive refracting power. The material of the third lens element 3 is plastic. An optical axis region 351 of the object-side surface 35 of the third lens element 3 is convex, and a periphery region 353 thereof is convex. An optical axis region 361 of the image-side surface 36 of the third lens element 3 is convex, and a periphery region 363 thereof is convex. In the embodiment, the object-side surface 35 and the image-side surface 36 of the third lens element 3 are aspheric surfaces.

The fourth lens element 4 has negative refracting power. The material of the fourth lens element 4 is plastic. An optical axis region 451 of the object-side surface 45 of the fourth lens element 4 is convex, and a periphery region 454 thereof is concave. An optical axis region 462 of the image-side surface 46 of the fourth lens element 4 is concave, and a periphery region 464 thereof is concave. In the embodiment, the object-side surface 45 and the image-side surface 46 of the fourth lens element 4 are aspheric surfaces.

The fifth lens element 5 has positive refracting power. The material of the fifth lens element 5 is plastic. An optical axis region 552 of the object-side surface 55 of the fifth lens element 5 is concave, and a periphery region 553 thereof is convex. An optical axis region 561 of the image-side surface 56 of the fifth lens element 5 is convex, and a periphery region 563 thereof is convex. In the embodiment, the object-side surface 55 and the image-side surface 56 of the fifth lens element 5 are aspheric surfaces.

The sixth lens element 6 has negative refracting power. The material of the sixth lens element 6 is plastic. An optical axis region 651 of the object-side surface 65 of the sixth lens element 6 is convex, and a periphery region 654 thereof is concave. An optical axis region 662 of the image-side surface 66 of the sixth lens element 6 is concave, and a periphery region 663 thereof is convex. In the embodiment, the object-side surface 65 and the image-side surface 66 of the sixth lens element 6 are aspheric surfaces.

Other detailed optical data of the first embodiment is as shown in FIG. 8. In the first embodiment, the effective focal length (EFL) of the optical imaging lens 10 is 1.686 mm, the half field of view (HFOV) thereof is 57.648°, the system length thereof is 5.608 mm, the F-number (Fno) thereof is 2.4, the image height thereof is 2.520 mm, wherein the system length refers to a distance from the object-side surface 15 of the first lens element 1 to the image plane 99 along the optical axis I.

Additionally, in the embodiment, a total of twelve surfaces, namely the object-side surfaces 15, 25, 35, 45, 55 and 65 as well as the image-side surfaces 16, 26, 36, 46, 56 and 66 of the first lens element 1, the second lens element 2, the third lens element 3, the fourth lens element 4, the fifth lens element 5 and the sixth lens element 6 are even aspheric surfaces. The aspheric surfaces are defined by the following equation:

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

Y: a distance from a point on an aspheric curve to the optical axis;

Z: a depth of the aspheric surface (i.e. a perpendicular distance between the point on the aspheric surface that is spaced by the distance Y from the optical axis and a tangent plane tangent to a vertex of the aspheric surface on the optical axis);

R: radius of curvature of the surface of the lens element;

K: conic constant $a_i$: $i^{th}$ aspheric coefficient

Each aspheric coefficient from the object-side surface 15 of the first lens element 1 to the image-side surface 66 of the sixth lens element 6 in the equation (1) is indicated in FIG. 9. In FIG. 9, the referential number 15 is one column that represents the aspheric coefficient of the object-side surface 15 of the first lens element 1, and the reference numbers in other columns can be deduced from the above.

Additionally, the relationship among the important parameters pertaining to the optical imaging lens 10 of the first embodiment is indicated in FIG. 30 and FIG. 31. Specifically, in FIG. 30, the unit of parameters from row T1 to row EFL is millimeter (mm).

wherein,

T1 represents the thickness of the first lens element 1 along the optical axis I;

T2 represents the thickness of the second lens element 2 along the optical axis I;

T3 represents the thickness of the third lens element 3 along the optical axis I;

T4 represents the thickness of the fourth lens element 4 along the optical axis I;

T5 represents the thickness of the fifth lens element 5 along the optical axis I;

T6 represents the thickness of the sixth lens element 6 along the optical axis I;

G12 represents a distance between the image-side surface 16 of the first lens element 1 and the object-side surface 25 of the second lens element 2 along the optical axis I, that is, an air gap between the first lens element 1 and the second element 2 along the optical axis I;

G23 represents a distance between the image-side surface 26 of the second lens element 2 and the object-side surface 35 of the third lens element 3 along the optical axis I, that is, an air gap between the second lens element 2 and the third lens element 3 along the optical axis I;

G34 represents a distance between the image-side surface 36 of the third lens element 3 and the object-side surface 45 of the fourth lens element 4 along the optical axis I, that is, an air gap between the third lens element 3 and the fourth lens element 4 along the optical axis I;

G45 represents a distance between the image-side surface 46 of the fourth lens element 4 and the object-side surface 55 of the fifth lens element 5 along the optical axis I, that is, an air gap between the fourth lens element 4 and the fifth lens element 5 along the optical axis I;

G56 represents a distance between the image-side surface 56 of the fifth lens element 5 and the object-side surface 65 of the sixth lens element 6 along the optical axis I, that is, an air gap between the fifth lens element 5 and the sixth lens element 6 along the optical axis I;

AAG represents a sum of five air gaps among the first lens element 1 through the sixth lens element 6 along the optical axis I, i.e., the sum of G12, G23, G34, G45 and G56;

ALT represents a sum of six lens element thicknesses of the first lens element 1 through the sixth lens element 6 along the optical axis I, i.e., the sum of T1, T2, T3, T4, T5 and T6;

TL represents a distance from the object-side surface 15 of the first lens element 1 to the image-side surface 66 of the sixth lens element 6 along the optical axis I;

TTL represents a distance from the object-side surface 15 of the first lens element 1 to the image plane 99 along the optical axis I;

BFL represents a distance from the image-side surface 66 of the sixth lens element 6 to the image plane 99 along the optical axis I;

ImgH is the image height of the optical imaging lens 10; and

EFL represents the effective focal length of the optical imaging lens 10, i.e. the effective focal length (EFL) of the overall optical imaging lens 10.

Further, it is defined that:

G6F is an air gap between the sixth lens element 6 and the filter 9 along the optical axis I;

TF is the thickness of the filter 9 along the optical axis I;

GFP is an air gap between the filter 9 and the image plane 99 along the optical axis I;

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

f6 is a focal length of the sixth lens element 6;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

n6 is a refractive index of the sixth lens element 6;

V1 is an Abbe number of the first lens element 1;

V2 is an Abbe number of the second lens element 2;

V3 is an Abbe number of the third lens element 3;

V4 is an Abbe number of the fourth lens element 4;

V5 is an Abbe number of the fifth lens element 5; and

V6 is an Abbe number of the sixth lens element 6.

Figure 7A:
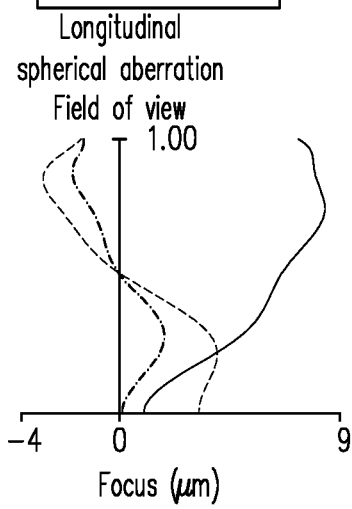
FIG. 7A to FIG. 7D are diagrams illustrating longitudinal spherical aberration and other aberrations of the optical imaging lens according to the first embodiment of the invention.
Figure 7B:
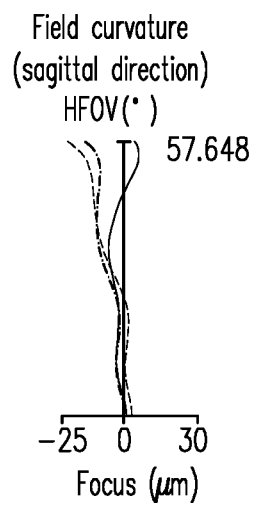
Figure 7C:
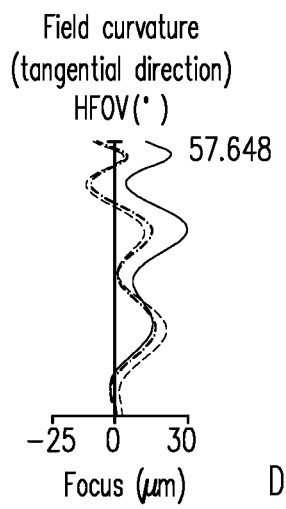
Figure 7D:
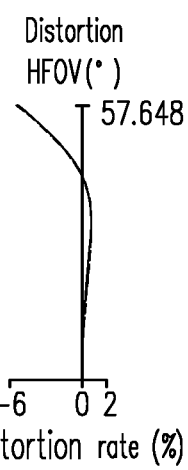

With reference to FIG. 7A to FIG. 7D, FIG. 7A is a diagram describing the longitudinal spherical aberration in the first embodiment, FIG. 7B and FIG. 7C are diagrams respectively describing the field curvature aberration in sagittal direction and field curvature aberration in the tangential direction on the image plane 99 of the first embodiment in the condition that the wavelength is 470 nm, 555 nm and 650 nm. FIG. 7D is a diagram describing distortion aberration of the image plane 99 of the first embodiment in the condition that the wavelength is 470 nm, 555 nm and 650 nm. In FIG. 7A which shows the longitudinal spherical aberration in the first embodiment in the condition that the pupil radius is 0.3512 mm, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within a range of +8.5 μm. Therefore, it is evident that the first embodiment can significantly improve spherical aberration of the same wavelength. Additionally, the distances between the three representative wavelengths are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within a range of ±30 μm, which represents that the optical system in the first embodiment can effectively eliminate aberration. In FIG. 7D, the diagram of distortion aberration shows that the distortion aberration in the first embodiment can be maintained within a range of ±6%, which shows that the distortion aberration in the first embodiment can meet the imaging quality requirement of the optical system. Based on the above, it is shown that the first embodiment can still provide good image quality compared with existing optical imaging lens under the condition where the system length is shortened to about 5.608 mm.

FIG. 10 is a schematic view illustrating an optical imaging lens according to a second embodiment of the invention, FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment, and the difference therebetween is as follows. The optical data, aspheric coefficients and the parameters of the lens elements 1, 2, 3, 4, 5 and 6 in the two embodiment are different to some extent. It should be noted that, in order to show the view clearly, some numerals for the optical axis region and periphery region which are similar to those in the first embodiment are omitted in FIG. 10.

Detailed optical data pertaining to the optical imaging lens 10 of the second embodiment is as shown in FIG. 12. In the optical imaging lens 10 of the second embodiment, the effective focal length of the optical imaging lens 10 is 1.298 mm, the half field of view (HFOV) is 53.957°, the Fno is 2.4, the system length is 5.459 mm, and the image height is 2.520 mm.

FIG. 13 shows each aspheric coefficient pertaining to the object-side surface 15 of the first lens element 1 through the image-side surface 66 of the sixth lens element 6 in the equation (1) in the second embodiment.

Additionally, the relationship among the important parameters pertaining to the optical imaging lens 10 of the second embodiment is indicated in FIG. 30 and FIG. 31.

In FIG. 11A which illustrates longitudinal spherical aberration of the second embodiment in the condition that the pupil radius is 0.2704 mm, the imaging point deviation of the off-axis ray at different heights is controlled within a range of ±43 μm. In FIGS. 11B and 11C which illustrate two diagrams of field curvature aberration, the focal length variation of the three representative wavelengths in the entire field of view falls within a range of ±90 μm. In FIG. 11D, the diagram of distortion aberration shows that the distortion aberration in the second embodiment can be maintained within a range of ±43%. In view of the above, the second embodiment can still provide a good imaging quality as compared to the first embodiment in the condition that the system length is reduced to about 5.459 mm.

Based on the above, it can be derived that the advantage of the second embodiment relative to the first embodiment is that the system length of the second embodiment is smaller than the system length of the first embodiment.

FIG. 14 is a schematic view illustrating an optical imaging lens according to a third embodiment of the invention. FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment, and the difference lies in optical data, aspheric coefficients and the parameters of the lens elements 1, 2, 3, 4, 5 and 6. Additionally, in the third embodiment, the four lens element 4 has positive refracting power, and the optical axis region 551 of the object-side surface 55 of the fifth lens element 5 is convex. It should be noted that, in order to show the view clearly, some numerals for the optical axis region and periphery region which are similar to those in the first embodiment are omitted in FIG. 14.

Detailed optical data pertaining to the optical imaging lens 10 of the third embodiment is as shown in FIG. 16. In the optical imaging lens 10 of the third embodiment, the total effective focal length is 1.384 mm, the half field of view (HFOV) is 68.000°, the f-number (Fno) is 2.4, the system length is 5.813 mm, and the image height is 2.520 mm.

FIG. 17 shows each aspheric coefficient pertaining to the object-side surface 15 of the first lens element 1 through the image-side surface 66 of the sixth lens element 6 in the equation (1) in the third embodiment.

Additionally, the relationship among the important parameters pertaining to the optical imaging lens 10 of the third embodiment is indicated in FIG. 30 and FIG. 31.

In FIG. 15A which illustrates longitudinal spherical aberration of the third embodiment in the condition that the pupil radius is 0.2884 mm, the imaging point deviation of the off-axis ray at different heights is controlled within a range of ±27 In FIGS. 15B and 15C which illustrate two diagrams of field curvature aberration, the focal length variation of the three representative wavelengths in the entire field of view falls within a range of ±70 μm. In FIG. 15D, the diagram of distortion aberration shows that the distortion aberration in the third embodiment can be maintained within a range of ±28%. In view of the above, the third embodiment can still provide a good imaging quality as compared to the first embodiment in the condition that the system length is reduced to about 5.813 mm.

In view of the above, it can be derived that the advantage of the third embodiment relative to the first embodiment is that the half field of view of the third embodiment is larger than the half field of view of the first embodiment.

Figure 18:
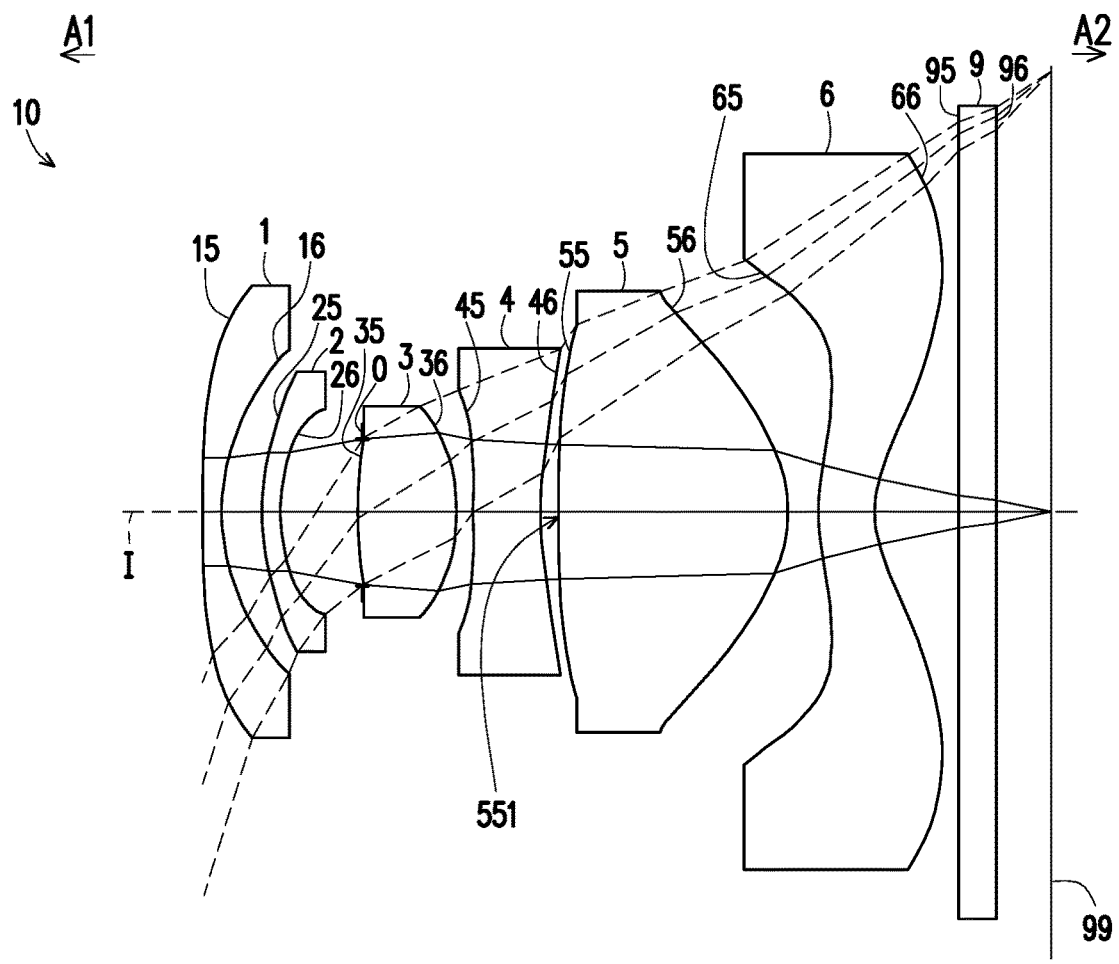
FIG. 18 is a schematic view illustrating an optical imaging lens according to a fourth embodiment of the invention.

FIG. 18 is a schematic view illustrating an optical imaging lens according to a fourth embodiment of the invention, and FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment, and the difference lies in optical data, aspheric coefficients and the parameters of the lens elements 1, 2, 3, 4, 5 and 6. Additionally, in the fourth embodiment, the optical axis region 551 of the object-side surface 55 of the fifth lens element 5 is convex. It should be noted that, in order to show the view clearly, some numerals for the optical axis region and periphery region which are similar to those in the first embodiment are omitted in FIG. 18.

Detailed optical data pertaining to the optical imaging lens 10 of the fourth embodiment is as shown in FIG. 20. In the optical imaging lens 10 of the fourth embodiment, the total effective focal length is 1.525 mm, the half field of view (HFOV) is 72.817°, the f-number (Fno) is 2.4, the system length is 4.851 mm, and the image height is 2.520 mm.

FIG. 21 shows each aspheric coefficient pertaining to the object-side surface 15 of the first lens element 1 through the image-side surface 66 of the sixth lens element 6 in the equation (1) in the fourth embodiment.

Additionally, the relationship among the important parameters pertaining to the optical imaging lens 10 of the fourth embodiment is indicated in FIG. 30 and FIG. 31.

Figures 19A, 19B, 19C, 19D:
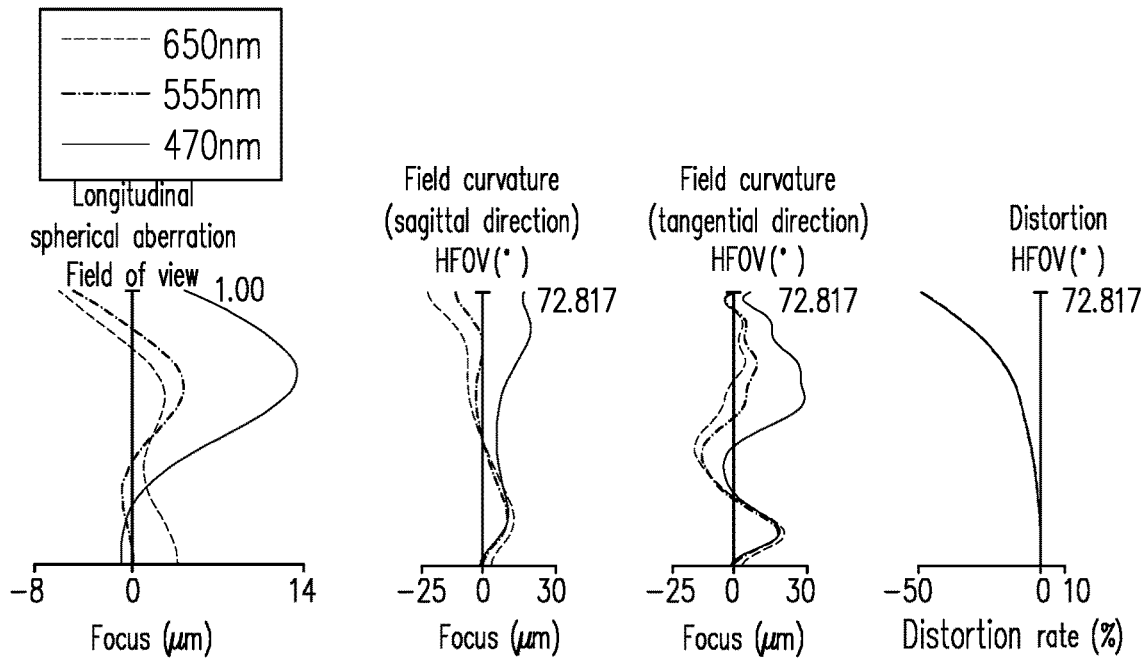
FIG. 19A to FIG. 19D are diagrams illustrating longitudinal spherical aberration and other aberrations of the optical imaging lens according to the fourth embodiment of the invention.

In FIG. 19A which illustrates longitudinal spherical aberration of the fourth embodiment in the condition that the pupil radius is 0.3176 mm, the imaging point deviation of the off-axis ray at different heights is controlled within a range of ±14 μm. In FIGS. 19B and 19C which illustrate two diagrams of field curvature aberration, the focal length variation of the three representative wavelengths in the entire field of view falls within a range of ±29.5 μm. In FIG.

19D, the diagram of distortion aberration shows that the distortion aberration in the fourth embodiment can be maintained within a range of ±50%. In view of the above, the fourth embodiment can provide a good imaging quality as compared to the first embodiment in the condition that the system length is reduced to about 4.851 mm.

Based on the above, it can be derived that the advantage of the fourth embodiment relative to the first embodiment is that the system length of the fourth embodiment is smaller than the system length of the first embodiment, the half field of view of the fourth embodiment is larger than the half field of view of the first embodiment, and the field curvature aberration of the fourth embodiment is smaller than the field curvature aberration of the first embodiment.

FIG. 22 is a schematic view illustrating an optical imaging lens according to a fifth embodiment of the invention, and FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment, and the difference lies in optical data, aspheric coefficients and the parameters of the lens elements 1, 2, 3, 4, 5 and 6. Additionally, in the fifth embodiment, the aperture 0 is disposed between the third lens element 3 and the fourth lens element 4, and the optical axis region 551 of the object-side surface 55 of the fifth lens element 5 is convex. It should be noted that, in order to show the view clearly, some numerals for the optical axis region and periphery region which are similar to those in the first embodiment are omitted in FIG. 22.

Detailed optical data pertaining to the optical imaging lens 10 of the fifth embodiment is as shown in FIG. 24. In the optical imaging lens 10 of the fifth embodiment, the total effective focal length is 1.974 mm, the half field of view (HFOV) is 58.037°, the f-number (Fno) is 2.4, the system length is 5.528 mm, and the image height is 2.520 mm.

FIG. 25 shows each aspheric coefficient pertaining to the object-side surface 15 of the first lens element 1 through the image-side surface 66 of the sixth lens element 6 in the equation (1) in the fifth embodiment.

Additionally, the relationship among the important parameters pertaining to the optical imaging lens 10 of the fifth embodiment is indicated in FIG. 30 and FIG. 31.

In FIG. 23A which illustrates longitudinal spherical aberration of the fifth embodiment in the condition that the pupil radius is 0.4112 mm, the imaging point deviation of the off-axis ray at different heights is controlled within a range of ±11 μm. In FIGS. 23B and 23C which illustrate two diagrams of field curvature aberration, the focal length variation of the three representative wavelengths in the entire field of view falls within a range of ±38 μm. In FIG. 23D, the diagram of distortion aberration shows that the distortion aberration in the fifth embodiment can be maintained within a range of ±22%. In view of the above, the fifth embodiment can still provide a good imaging quality as compared to the first embodiment in the condition that the system length is reduced to about 5.528 mm.

Based on the above, it can be derived that the advantage of the fifth embodiment relative to the first embodiment is that the system length of the fifth embodiment is smaller than the system length of the first embodiment, the aperture 0 of the fifth embodiment is closer to the image side relative to the aperture 0 of the first embodiment. Therefore, the half field of view of the fifth embodiment is larger than the half field of view of the first embodiment.

FIG. 26 is a schematic view illustrating an optical imaging lens according to a sixth embodiment of the invention, FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment, and the difference lies in optical data, aspheric coefficients and the parameters of the lens elements 1, 2, 3, 4, 5 and 6. It should be noted that, in order to show the view clearly, some numerals for the optical axis region and periphery region which are similar to those in the first embodiment are omitted in FIG. 26.

Detailed optical data pertaining to the optical imaging lens 10 of the sixth embodiment is as shown in FIG. 28. In the optical imaging lens 10 of the sixth embodiment, the total effective focal length is 1.308 mm, the half field of view (HFOV) is 62.916°, the f-number (Fno) is 2.4, the system length is 5.455 mm and the image height is 2.520 mm.

FIG. 29 shows each aspheric coefficient pertaining to the object-side surface 15 of the first lens element 1 through the image-side surface 66 of the sixth lens element 6 in the equation (1) in the sixth embodiment.

Additionally, the relationship among the important parameters pertaining to the optical imaging lens 10 of the sixth embodiment is indicated in FIG. 30 and FIG. 31.

In FIG. 27A which illustrates longitudinal spherical aberration of the sixth embodiment in the condition that the pupil radius is 0.2726 mm, the imaging point deviation of the off-axis ray at different heights is controlled within a range of +40 μm. In FIGS. 27B and 27C which illustrate two diagrams of field curvature aberration, the focal length variation of the three representative wavelengths in the entire field of view falls within a range of ±70 μm. In FIG. 27D, the diagram of distortion aberration shows that the distortion aberration in the sixth embodiment can be maintained within a range of ±15%. In view of the above, the sixth embodiment can still provide a good imaging quality as compared to the first embodiment in the condition that the system length is reduced to about 5.455 mm.

Based on the above, it can be derived that the advantage of the sixth embodiment relative to the first embodiment is that the system length of the sixth embodiment is smaller than the system length of the first embodiment, and the half field of view of the sixth embodiment is larger than the half field of view of the first embodiment. Moreover, since the thickness difference of each of the lens elements in the optical axis region and the periphery region is smaller, the sixth embodiment can be manufactured more easily than the first embodiment and thus having higher yield rate.

Referring to FIG. 30 to FIG. 31, FIG. 30 and FIG. 31 are table diagrams showing the optical parameters provided in the foregoing six embodiments.

If the optical parameters provided in the embodiments of the invention satisfy at least one of the following conditions, the design of the optical imaging lens with favorable optical performance and the reduced length in whole becomes technically feasible:

1. In order to shorten the system length of the lens element, it is one of the means of the embodiments of the invention to shorten thickness of the lenses and air gap between lenses. In the meantime, in consideration of manufacturing difficulty and imaging quality, the thickness of lens element and air gap between lens elements need to be coordinated, or the ratio of specific optical parameters in combination of specific group of lens element needs to be adjusted such that the limitation of numerals as set forth in the conditions below is satisfied and a better configuration of the optical imaging lens 10 may be attained.

The optical imaging lens 10 may satisfy the condition expression (T1+G12)/(T2+G34)≤3.300, and more preferably satisfy 0.300≤(T1+G12)/(T2+G34)≤3.300;

The optical imaging lens 10 may satisfy the condition expression (T1+G12+T3)/(T2+G34+G45)≤2.900; and more preferably satisfy 0.300≤(T1+G12+T3)/(T2+G34+G45) ≤2.900;

The optical imaging lens 10 may satisfy the condition expression ALT/BFL≤2.700; and more preferably satisfy 0.900≤ALT/BFL≤2.700;

The optical imaging lens 10 may satisfy the condition expression AAG/BFL≤1.400, and more preferably satisfy 0.600≤AAG/BFL≤1.400;

The optical imaging lens 10 may satisfy the condition expression T6/T4≤1.500, and more preferably satisfy 0.500≤T6/T4≤1.500;

The optical imaging lens 10 may satisfy the condition expression T3/G23≤2.000, and more preferably satisfy 0.100≤T3/G23≤2.000;

The optical imaging lens 10 may satisfy the condition expression (T1+T3+T6)/(T5+G56)≤1.600, and more preferably satisfy 0.100≤(T1+T3+T6)/(T5+G56)≤1.600;

The optical imaging lens 10 may satisfy the condition expression AAG/(G23+G45)≤2.900, and more preferably satisfy 1.400≤AAG/(G23+G45)≤2.900;

The optical imaging lens 10 may satisfy the condition expression (T2+G34+T4+T6)/(G12+G23)≤1.300, and more preferably satisfy 0.300≤(T2+G34+T4+T6)/(G12+G23) ≤1.300;

The optical imaging lens 10 may satisfy the condition expression (T1+T2+T6)/(G23+T3)≤1.300, and more preferably satisfy 0.100≤(T1+T2+T6)/(G23+T3)≤1.300;

The optical imaging lens 10 may satisfy the condition expression ALT/T5≤2.800, and more preferably satisfy 1.200≤ALT/T5≤2.800;

The optical imaging lens 10 may satisfy the condition expression (T1+T4+G45+T6)/(G12+G34+G56)≤1.700, and more preferably satisfy 0.100≤(T1+T4+G45+T6)/(G12+G34+G56)≤1.700.

2. If one of the limitation of numerals as set forth in the conditions below is satisfied, the ratio of EFL and other optical parameters is maintained to be within an appropriate range, facilitating the field of view angle to be broadened in the process of reducing thickness of the optical system.

The optical imaging lens 10 may satisfy the condition expression EFL/AAG≤1.600, and more preferably satisfy 0.200≤EFL/AAG≤1.600;

The optical imaging lens 10 may satisfy the condition expression ALT/EFL≤2.300, and more preferably satisfy 1.000≤ALT/EFL≤2.300;

The optical imaging lens 10 may satisfy the condition expression TTL/EFL≤4.300, and more preferably satisfy 1.700≤TTL/EFL≤4.300;

3. If one of the limitation of numerals as set forth in the conditions below is satisfied, The ratio of the parameter of the optical element to the length of the optical imaging lens is maintained to be within an appropriate range to avoid that the parameter of the optical element is too small for the optical element to be produced, or avoid that the parameter of the optical element is too large and consequently the length of the optical imaging lens is too long.

The optical imaging lens 10 may satisfy the condition expression TL/BFL≤4.400, and more preferably satisfy 2.300≤TL/BFL≤4.400;

The optical imaging lens 10 may satisfy the condition expression TTL/(T4+T5)≤4.200, and more preferably satisfy 2.800≤TTL/(T4+T5)≤4.200;

The optical imaging lens 10 may satisfy the condition expression TL/(T4+G45+T5+G56+T6)≤2.800, and more preferably satisfy 1.600≤TL/(T4+G45+T5+G56+T6) ≤2.800.

In addition, it is optional to select an arbitrary combination relationship of the parameter in the embodiment to increase limitation of the optical imaging lens for the ease of designing the optical imaging lens having the same structure in the invention. Due to the unpredictability in the design of an optical system, with the framework of the embodiments of the invention, under the circumstances where the above-described conditions are satisfied, the optical imaging lens according to the embodiments of the invention with shorter length, increased aperture, broadened field of view, improved imaging quality, or better yield rate can be preferably achieved so as to improve the shortcoming of prior art.

The above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. It should be noted that the above-described details can be optionally combined and applied to the other embodiments of the invention under the condition where they are not in conflict with one another.

The numeral ranges containing the maximum values, the minimum values, and the values there between obtained through the combination of proportional relationship of the optical parameter disclosed in each embodiment of the invention may all be used for implementation.

Based on the above, the optical imaging lens 10 in the embodiment of the invention can achieve the following effects and advantages:

1. The longitudinal spherical aberrations, astigmatism aberrations and distortion aberrations of each of the embodiments of the invention are all complied with usage specifications. Moreover, the off-axis rays of different heights of the three representative wavelengths red, green and blue are all gathered around imaging points, and according to a deviation range of each curve, it can be seen that deviations of the imaging points of the off-axis rays of different heights are all controlled to achieve a good capability to suppress spherical aberration, aberration and distortion aberration. Further referring to the imaging quality data, distances among the three representative wavelengths red, green and blue are fairly close, which represents that the optical imaging lens of the embodiments of the invention has a good concentration of rays with different wavelengths and under different states, and have an excellent capability to suppress dispersion, so it is learned that the optical imaging lens of the embodiments of the invention has good optical performance.

2. Length of lens can be effectively reduced and field of view angle can be enhanced with a combination of the designs described below while a good imaging quality can be achieved: The design that the first lens element 1 has negative refracting power and the second lens element 2 has negative refracting power can effectively broaden field of view. The design that the periphery region 253 of the object-side surface 25 of the second lens element 2 is convex can correct aberration generated by the first lens element 1. The design that the optical axis region 462 of the image-side surface 46 of the fourth lens element 4 is concave facilitates to correct the aberration generated by the first lens element 1 to the third lens element 3. The design that the optical axis region 662 of the image-side surface 66 of the sixth lens element 6 is concave facilitates to reduce length of lens. The design that the periphery region 663 of the image-side surface 66 of the sixth lens element 6 is convex facilitates to correct overall aberration.

3. When the condition expression V2+V3≤100.000 is satisfied, it is possible for the optical imaging lens 10 to reduce the length of the lens while low chromatic aberration of system can be maintained, and it is more preferable that the condition expression 100.000≤V2+V3≤130.000 is satisfied. When the condition expression (T1+G12+T5+G56)/(T2+G23)≤3.400 or (T1+G12+T5+G56+T6)/(T2+G23) ≤3.900 is satisfied, it is possible for the optical imaging lens 10 to reduce the length of lens without increasing assembling difficulty of lens element, and it is more preferable that the condition expression 1.100≤(T1+G12+T5+G56)/(T2+G23)≤3.400 or 1.200≤(T1+G12+T5+G56+T6)/(T2+G23) ≤3.900 is satisfied.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element and a sixth lens element arranged in sequence from an object side to an image side along an optical axis, each of the first to sixth lens elements comprising an object-side surface facing the object side and allowing imaging rays to pass through and an image-side surface facing the image side and allowing the imaging rays to pass through, wherein, the first lens element has negative refracting power;

the second lens element has negative refracting power; a periphery region of the object-side surface of the second lens element is convex;

an optical axis region of the image-side surface of the fourth lens element is concave;

an optical axis region of the image-side surface of the sixth lens element is concave, and a periphery region of the image-side surface of the sixth lens element is convex;

wherein lens elements of the optical imaging lens having refracting power are only the above-mentioned six lens elements, and the optical imaging lens satisfies V2+V3≥100.000, and (T1+G12+T5+G56)/(T2+G23) ≤3.400, wherein V2 is an Abbe number of the second lens element, V3 is an Abbe number of the third lens element, T1 is a thickness of the first lens element along the optical axis, G12 is an air gap between the first lens element and the second lens element along the optical axis, T5 is a thickness of the fifth lens element along the optical axis, G56 is an air gap between the fifth lens element and the sixth lens element along the optical axis, T2 is a thickness of the second lens element along the optical axis, and G23 is an air gap between the second lens element and the third lens element along the optical axis.

2. The optical imaging lens according to claim 1, wherein the optical imaging lens further satisfies ALT/EFL≤2.300, wherein ALT represents a sum of six lens element thicknesses of the first lens element through the sixth lens element along the optical axis, and EFL represents an effective focal length of the optical imaging lens.

3. The optical imaging lens according to claim 1, wherein the optical imaging lens further satisfies AAG/BFL≤1.400, wherein AAG is a sum of five air gaps among the first lens element through the sixth lens element along the optical axis, and BFL is a distance from the image-side surface of the sixth lens element to an image plane along the optical axis.

4. The optical imaging lens according to claim 1, wherein the optical imaging lens further satisfies TTL/(T4+T5) ≤4.200, wherein TTL represents a distance from the object-side surface of the first lens element to an image plane along the optical axis, and T4 is a thickness of the fourth lens element along the optical axis.

5. The optical imaging lens according to claim 1, wherein the optical imaging lens further satisfies TL/(T4+G45+T5+G56+T6)≤2.800, wherein TL is a distance from the object-side surface of the first lens element to an image-side surface of the sixth lens element along the optical axis, T4 is a thickness of the fourth lens element along the optical axis, G45 is an air gap between the fourth lens element and the fifth lens element along the optical axis, and T6 is a thickness of the sixth lens element along the optical axis.

6. The optical imaging lens according to claim 1, wherein the optical imaging lens further satisfies (T1+G12)/(T2+G34)≤3.300, wherein G34 is an air gap between the third lens element and the fourth lens element along the optical axis.

7. The optical imaging lens according to claim 1, wherein the optical imaging lens further satisfies (T1+T3+T6)/(T5+G56)≤1.600, wherein T3 is a thickness of the third lens element along the optical axis, and T6 is a thickness of the sixth lens element along the optical axis.

8. The optical imaging lens according to claim 1, wherein the optical imaging lens further satisfies (T2+G34+T4+T6)/(G12 G23)≤1.300, wherein G34 is an air gap between the third lens element and the fourth lens element along the optical axis, T4 is a thickness of the fourth lens element along the optical axis, and T6 is a thickness of the sixth lens element along the optical axis.

9. The optical imaging lens according to claim 1, wherein the optical imaging lens further satisfies T6/T4≤1.500, wherein T6 is a thickness of the sixth lens element along the optical axis, and T4 is a thickness of the fourth lens element along the optical axis.

10. The optical imaging lens according to claim 1, wherein the optical imaging lens further satisfies EFL/AAG≤1.600, wherein EFL represents an effective focal length of the optical imaging lens, and AAG represents a sum of five air gaps among the first lens element through the sixth lens element along the optical axis.

11. An optical imaging lens, comprising a first lens element, a second lens element, a third lens element, a fourth lens element, a fifth lens element and a sixth lens element arranged in sequence from an object side to an image side along an optical axis, each of the first to sixth lens elements comprising an object-side surface facing the object side and allowing imaging rays to pass through and an image-side surface facing the image side and allowing the imaging rays to pass through, wherein, the first lens element has negative refracting power;

the second lens element has negative refracting power, a periphery region of the object-side surface of the second lens element is convex;

an optical axis region of the image-side surface of the fourth lens element is concave;

an optical axis region of the image-side surface of the sixth lens element is concave, and a periphery region of the image-side surface of the sixth lens element is convex;

wherein lens elements of the optical imaging lens having refracting power are only the above-mentioned six lens elements, and the optical imaging lens satisfies $V2+V3 \geq 100.000$, and $(T1+G12+T5+G56+T6)/(T2+G23) \leq 3.900$, wherein V2 is an Abbe number of the second lens element, V3 is an Abbe number of the third lens element, T1 is a thickness of the first lens element along the optical axis, G12 is an air gap between the first lens element and the second lens element along the optical axis, T5 is a thickness of the fifth lens element along the optical axis, G56 is an air gap between the fifth lens element and the sixth lens element along the optical axis, T6 is a thickness of the sixth lens element along the optical axis, T2 is a thickness of the second lens element along the optical axis, and G23 is an air gap between the second lens element and the third lens element along the optical axis.

12. The optical imaging lens according to claim 11, wherein the optical imaging lens further satisfies $ALT/BFL \leq 2.700$, wherein ALT represents a sum of six lens element thicknesses of the first lens element through the sixth lens element along the optical axis, and BFL is a distance from the image-side surface of the sixth lens element to an image plane along the optical axis.

13. The optical imaging lens according to claim 11, wherein the optical imaging lens further satisfies $AAG/(G23+G45) \leq 2.900$, wherein AAG represents a sum of five air gaps among the first lens element through the sixth lens element along the optical axis I, and G45 is an air gap between the fourth lens element and the fifth lens element along the optical axis.

14. The optical imaging lens according to claim 11, wherein the optical imaging lens further satisfies $TTL/EFL \leq 4.300$, wherein TTL represents a distance from the object-side surface of the first lens element to an image plane along the optical axis, and EFL represents an effective focal length of the optical imaging lens.

15. The optical imaging lens according to claim 11, wherein the optical imaging lens further satisfies $TL/BFL \leq 4.400$, wherein TL represents a distance from the object-side surface of the first lens element to the image-side surface of the sixth lens element along the optical axis, and BFL is a distance from the image-side surface of the sixth lens element to an image plane along the optical axis.

16. The optical imaging lens according to claim 11, wherein the optical imaging lens further satisfies $(T1+G12+T3)/(T2+G34+G45) \leq 2.900$, wherein T3 is a thickness of the third lens element along the optical axis, G34 is an air gap between the third lens element and the fourth lens element along the optical axis, and G45 is an air gap between the fourth lens element and the fifth lens element along the optical axis.

17. The optical imaging lens according to claim 11, wherein the optical imaging lens further satisfies $(T1+T2+T6)/(G23+T3) \leq 1.300$, wherein T3 is a thickness of the third lens element along the optical axis.

18. The optical imaging lens according to claim 11, wherein the optical imaging lens further satisfies $(T1+T4+G45+T6)/(G12+G34+G56) \leq 1.700$, wherein T4 is a thickness of the fourth lens element along the optical axis, G45 is an air gap between the fourth lens element and the fifth lens element along the optical axis, and G34 is an air gap between the third lens element and the fourth lens element along the optical axis.

19. The optical imaging lens according to claim 11, wherein the optical imaging lens further satisfies $T3/G23 \leq 2.000$, wherein T3 is a thickness of the third lens element along the optical axis.

20. The optical imaging lens according to claim 11, wherein the optical imaging lens further satisfies $ALT/T5 \leq 2.800$, wherein ALT represents a sum of six lens element thicknesses of the first lens element through the sixth lens element along the optical axis.

* * * * *